United States Patent
Lagrange et al.

(10) Patent No.: US 8,326,322 B2
(45) Date of Patent: Dec. 4, 2012

(54) METHODS FOR MANAGING COMMUNICATIONS OF A WIRELESS COMMUNICATIONS NETWORK, CORRESPONDING STORAGE MEANS AND DEVICES

(75) Inventors: Pascal Lagrange, Rennes (FR); Brice Le Houerou, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/626,741

(22) Filed: Nov. 27, 2009

(65) Prior Publication Data
US 2010/0159832 A1 Jun. 24, 2010

(30) Foreign Application Priority Data
Nov. 28, 2008 (FR) .................................. 08 58126
Nov. 28, 2008 (FR) .................................. 08 58131

(51) Int. Cl.
*H04W 4/02* (2009.01)
(52) U.S. Cl. .................. 455/456.1; 455/452.2; 455/423; 455/414.2
(58) Field of Classification Search .................. 455/423, 455/425, 445, 452.2, 452.1, 9, 10, 18, 449, 455/456.3, 562.1, 277.2, 456.1, 414.2; 370/237
See application file for complete search history.

(56) References Cited

U.S. PATENT DOCUMENTS

| | | | |
|---|---|---|---|
| 5,559,496 A | 9/1996 | Dubats | |
| 2004/0104822 A1 | 6/2004 | Pieralli | |
| 2008/0019289 A1 | 1/2008 | Monden et al. | |
| 2008/0095058 A1* | 4/2008 | Dalmases et al. | 370/237 |
| 2008/0187067 A1* | 8/2008 | Wang et al. | 375/267 |
| 2009/0007049 A1* | 1/2009 | Kitamura | 716/15 |
| 2009/0161572 A1 | 6/2009 | Lagrange et al. | |
| 2010/0113099 A1* | 5/2010 | Uno et al. | 455/562.1 |

FOREIGN PATENT DOCUMENTS

| | | |
|---|---|---|
| EP | 1406466 A2 | 4/2004 |
| EP | 1659813 A1 | 5/2006 |
| EP | 1956732 A1 | 8/2008 |
| WO | 2006/006117 A1 | 1/2006 |

OTHER PUBLICATIONS

Richard Brooks, et al., Distributed Target Classification and Tracking in Sensor Networks, Proceedings of the IEEE, vol. 91, No. 8, Aug. 2003, pp. 1163 to 1171.

(Continued)

*Primary Examiner* — John J Lee
(74) *Attorney, Agent, or Firm* — Fitzpatrick, Cella, Harper & Scinto

(57) ABSTRACT

A method for managing communications in a wireless communications network comprising a set of pairs constituted by a sender device and a receiver device, each of the devices having a determined area of communications coverage, the coverage areas of each pair having a mutual intersection area. Such a method comprises the followings steps: determining future trajectories of a disturbing mobile obstacle as a function of a set of prior positions of the disturbing mobile obstacle, a position of an obstacle being determined as a function of areas of mutual overlapping of at least two disturbed intersecting areas, a disturbed intersecting area having a given state of disturbance according to a determined criterion of quality of communications between the devices of the pairs corresponding to the disturbed intersection area; establishing a forecast diagnostic of quality of communications by examining the determined future trajectory or trajectories; managing the routing of communications as a function of the established forecast diagnostic.

20 Claims, 20 Drawing Sheets

OTHER PUBLICATIONS

Javed Aslam, et al., Tracking a Moving Object with a Binary Sensor Network, SenSys '03, 2003, pp. 150 to 161.
Philippe Le Bars, et al., U.S. Appl. No. 12/626,730, filed Nov. 27, 2009.
Lionel Tocze, et al., U.S. Appl. No. 12/596,415, filed Oct. 16, 2009.
French Search Report dated Jul. 10, 2009 in corresponding French Application FR 0858131.
French Search Report dated Jul. 6, 2009 in corresponding French Application FR 0858126.
IEEE Standard 802.15.1-2005, IEEE Standard for Information technology—Telecommunications and information exchange between systems—Local and metropolitan area networks—Specific requirements, Jun. 14, 2005.
IEEE Standard 802.11e-2005, IEEE Standard for Information technology—Telecommunications and information exchange between systems—Local and metropolitan area networks—Specific requirements, Nov. 11, 2005.
IEEE Standard 802.15.4-2009, IEEE Standard for Information technology—Telecommunications and information exchange between systems—Local and metropolitan area networks—Specific requirements, Apr. 17, 2009 (Amendment to IEEE Std 802.15.4-2006).
IEEE Standard 802.15.3-2003, IEEE Standard for Information technology—Telecommunications and information exchange between systems—Local and metropolitan area networks—Specific requirements, Sep. 29, 2003.

* cited by examiner

METHODS FOR MANAGING COMMUNICATIONS OF A WIRELESS COMMUNICATIONS NETWORK, CORRESPONDING STORAGE MEANS AND DEVICES

1. FIELD OF THE INVENTION

The field of the invention is that of communications networks and more particularly that of wireless communications networks using directional antennas.

More specifically, the invention relates to a method for managing communications in a wireless communications network.

The invention can be applied especially but not exclusively to radio communications networks in which radio communications are liable to suffer fading and/or shadowing through obstacles.

Throughout the present description, the term "obstacle" is understood to mean any physical element distinct from the sender and receiver devices of the network, contained in the overall coverage area of the network and liable to disturb wireless communications links.

2. TECHNOLOGICAL BACKGROUND

Home wireless networks or PANs (Personal Area Networks) are traditionally designed to interconnect communications devices, for example digital instruments, telephones, personal digital assistants, speakers, television units, multimedia players situated in proximity to the user. The range of a communications network of this kind is of the order of a few meters. Such a network can also be used to make the different personal devices communicate with one another (this is commonly known as intra-personal communications) or to connect them to applications supported by the Internet for example.

Home networks may be wired (as is the case for USB type and Ethernet type networks or again according to the IEEE 1394 standards) but may also rely on the use of a wireless medium. The term used then is wireless home network or wireless personal area network (WPAN). The Bluetooth (IEEE 802.15.1), UWB, ZigBee (IEEE 802.15.4), IEEE 802.11e or IEEE 802.15.3 standards are to date among the most widely used protocols for networks of this type.

Such protocols generally provide for two types of access to the shared wireless medium.

A first type of access is that of the collision detection mode (also called CSMA/CD or Carrier Sense Multiple Access/Collision Detection). This type of access allows each of the devices of the communications network to manage its sending operations as a function of its needs and the availability of the medium. When there is no information to be transmitted, the device receives data packets that travel on the medium. When this device needs to send one or more data packets, it ascertains that no frame has been sent on the medium. If this is the case, it can send its data packet. If this is not the case, it awaits the end of the transmission in progress. Since the method of access is that of collision detection, when sending, a device may detect a problem of contention and stop in order to re-send its data packet subsequently, i.e. when it has the floor again. In order to minimize the risk of undergoing a second collision with a same device, each device of the network waits for a certain period (which may be a random period) before attempting a new operation of transmission. However, so as not to saturate a network which might be already highly loaded in terms of communications, a device of the network does not try indefinitely to retransmit a packet of data if, at each attempt, it is in a state of conflict with another device of the network. Thus, after a certain number of unsuccessful tries, the data packet is eliminated, thus preventing the collapse of the network. The higher layers are then alerted to the failure of transmission of the message.

A second type of access is a time division multiple access (TDMA) mode. This second mode of access is a multiplexing mode used for the transmission of several signals on one and the same communications channel. This is time multiplexing, the principle of which is that of subdividing the available time into several time slots or speech times which are successively allotted to the different devices of the network.

Networks of this kind rely classically on the presence of a master device responsible for setting up connections of the network, synchronizing the speech times or time slots of each of the devices of the network and arbitrating access to the shared wireless medium.

Radio transmission systems currently use a wide range of transmission frequencies, generally from 2.5 GHz and 60 GHz. These frequencies are particularly well suited to data transmission at very high bit-rates in a limited range, for example as means of connectivity between the different elements of a "home cinema" type communications network. Indeed, in this case of use, the range is limited to about ten meters. However, the bit rates brought into play are very high (over one gigabit per second or Gbps or Gbit/s) owing to the nature (audio, video) and very high resolution of the information transmitted.

The use of transmission and reception antennas may furthermore play a crucial role in the quality of communications for wireless home networks of this kind.

An isotropic antenna, i.e. an antenna radiating with the same physical characteristics in every direction of space, is a theoretical model that cannot be made in practice. Indeed, the energy radiated by an antenna is in reality unequally distributed in space, certain directions being more favored. The term used then is "radiation lobes". A radiation pattern of an antenna can be used to view these radiation lobes in all three directions of space, i.e. in the horizontal plane or in the vertical plane including the most important lobe. The proximity and conductivity of the ground or of the conductive masses surrounding the antenna may furthermore have a major influence on the radiation pattern.

The directivity of an antenna in the horizontal plane is a major characteristic in the choice of an antenna. Indeed, an omnidirectional antenna radiates in the same way in every direction of the horizontal plane while a directional antenna for its part has one or two lobes that are appreciably more important than the others. The term used then is "major lobes". It must be noted that an antenna is all the more directional as the most important lobe is narrow. The directivity corresponds to the width of the major lobe, between the attenuation angles at 3 dB. The gain of an antenna is then defined as the increase in the power sent or received in the major lobe relative to an omnidirectional antenna.

A signal processing based on the directivity of the antennas (known as beam-forming) is a technique that relies on the use of transmission tables or reception centers which control the orientation and/or the sensitivity of an antenna as a function of a radiation pattern. At the reception of a radio signal, this technique is used to increase the sensitivity of the receiver device in a desired direction and thus reduce the sensitivity of the antenna for areas of interference or highly noisy areas. During the transmission of a radio signal, the technique of antenna directivity increases the power of the radio signal in a desired direction.

Although such communications systems are advantageous from the viewpoint of their installation and their particularly high applications bit-rates (allowed for high frequencies such as in the 60 GHz frequency band for example), they are highly sensitive to interference and shadowing of radio links communications caused for example by obstacles. Thus, the relevance of the use of communications links between the different devices of the network is highly correlated with the positioning and shifting of obstacles in the network, which are all so many sources of dynamic masking for the network.

A prior-art technique, described in the European patent application EP1406466 presents a technique for tracking a mobile device in a communications network. It consists more particular in tracking the mobile device by detecting successive positions in different sub-areas of the network.

However, such a method assumes the sending by the mobile device (whose position has to be determined) of a piece of information to the detection devices of the network so that they determine its position in the network. Such a technique furthermore does not meet the problem of locating a disturbing obstacle, which is distinct from the devices of the network.

3. GOALS OF THE INVENTION

The invention is aimed especially at overcoming these different drawbacks of the prior art.

More specifically, it is an aim of at least one embodiment of the invention to provide a technique to manage the communications of a communications network.

At least one embodiment of the invention is also aimed at providing a technique of this kind to detect and locate one or more mobile or fixed obstacles leading to disturbances for communications between devices of the network.

It is another aim of at least one embodiment of the invention to provide a technique of this kind to identify a mobile or fixed obstacle leading to disturbances for the communications of the devices of a network, without interaction (or communications) between that disturbing obstacle and the devices of the network.

It is another goal of at least one embodiment of the invention to provide a technique of this kind to differentiate a mobile disturbing obstacle from fixed disturbing obstacles in the coverage area of the network.

It is another goal of at least one embodiment of the invention to provide a technique for estimating the future trajectory of one or more disturbing mobile obstacles so as to anticipate possible disturbances that might be caused by the disturbing mobile obstacles to the devices of the network.

In other words, it is a goal of the present invention to adapt the routing of the communications as a function of foreseeable potential disturbances.

It is yet another goal of at least one embodiment of the invention to provide a technique to quantify the impact of the disturbing obstacles in terms of quality of service of the network.

It is yet another goal of at least one embodiment of the invention to provide a technique of this kind to assess the relevance of an adaptation of the routing as a function of the duration of a disturbance caused by at least one disturbing obstacle.

It is a complementary goal of at least one embodiment of the invention to provide a technique of this kind that relies solely on means conventionally used to transmit data in a wireless communications network, i.e. a technique that is simple to implement and costs little.

4. SUMMARY OF THE INVENTION

One embodiment of the invention proposes a method of managing communications in a wireless communications network comprising a set of pairs constituted by a sender device and a receiver device, each of the devices having a determined area of communications coverage, the coverage areas of each pair having a mutual intersection area. A method of this kind comprises steps of:

determining at least one future trajectory of a disturbing mobile obstacle as a function of a set of prior positions of said disturbing mobile obstacle, a position of an obstacle being determined as a function of areas of mutual overlapping of at least two disturbed intersecting areas, a disturbed intersecting area having a given state of disturbance according to a determined criterion of quality of communications between the devices of the pairs corresponding to said disturbed intersection area; and establishing a forecast diagnostic of quality of communications by examining the determined future trajectory or trajectories.

The general principle of the invention consists in locating one or more disturbing mobile obstacles in a wireless communications network, and, through analysis of prior positions of each of these obstacles, estimating their future trajectories so that forecast diagnostics of a future state of disturbance of the network is established.

Thus, the invention relies on a wholly novel and inventive approach enabling the assessment of the potential state of disturbance of the communications of the network in the future, in other words, foreseeing the communications (or communications links) that are liable to be cut off or to deteriorate (through a phenomenon of masking for example) owing to the presence of disturbing mobile obstacles in the coverage area of communications of the devices of the network.

Such forecast diagnostics as established therefore enable the anticipation of an estimated drop in quality of service of the network and thus enable a reconfiguration of the topology of the network in adapting the routing of the communications as a function of future disturbances of the network.

Advantageously, said step of determining at least one future trajectory comprises a step of determining at least one segment of a future trajectory of the disturbing mobile obstacle by extrapolation of a segment of a prior trajectory of said disturbing mobile obstacle. Said step of establishing forecast diagnostics is performed from said determined segment or segments of a future trajectory.

The invention thus makes it possible to plan the implementation of a first method for estimating the future trajectory of a disturbing mobile obstacle liable to give rise to a dynamic disturbance in communications of the network, such a method being based on a vector extrapolation of a trajectory on the basis of passed positions of the mobile obstacle. Thus, forecast diagnostics of quality of communications may be established in order to provide for a possible reconfiguration of communications and thus carry out an "avoidance maneuver" to avoid expected potential disturbances.

It must be noted that the disturbance or disturbances related to the disturbing mobile obstacle considered are virtual disturbances and will not take concrete shape if a predictive adjustment of the routing of the communications of the network can be implemented in order to bypass this disturbance.

According to one variant, said step of determining at least one future trajectory comprises a step of determining at least one segment of a future trajectory of the disturbing mobile obstacle by recognition of a segment of a prior trajectory with which said segment or segments of a future trajectory are associated in a pre-determined way. Said step of establishing forecast diagnostics is performed from said determined segment or segments of a future trajectory.

In this variant, the invention provides for the implementation of a second method of estimating the future trajectory of a disturbing mobile obstacle liable to give rise to a dynamic disturbance of the communications of the network, this method being based on the recognition of a route already taken in the past by another disturbing mobile obstacle. As above, forecast diagnostics of quality of communications can be established in order to provide for a possible reconfiguration of the communications.

A gain in time can therefore be provided since the links of causality between a mobile obstacle and the disturbances set up in the past may have been memorized. Thus, an anticipation of future disturbance can be done (along therefore with a predictive adjustment of the routing of the network) thus preventing the establishing of communications at least partly encountering a route which is obviously used by mobile obstacles. A counter giving the times for which the route (or a part of a route) has been taken by an obstacle can specify the acuteness of the risk.

According to an advantageous characteristic, the method comprises successive preliminary steps of determining areas of mutual overlapping of at least two disturbed intersecting areas, the disturbing mobile obstacle being detected from said determined mutual overlapping areas.

By analysis of the state of disturbance of the overlapping areas during a pre-determined period, it is therefore possible to detect passed positions of a same disturbing obstacle and deduce its mobile character therefrom.

Preferably, the method comprises a step of detecting a fixed obstacle at a given position from said determined mutual overlapping areas, said at least one future trajectory of the disturbing mobile obstacle being determined as a function of the given position of the detected fixed obstacle and at least one sub-set of the mutual overlapping areas that have been used to detect the disturbing mobile obstacle.

Thus, the estimation of the potential impact of the mobile obstacles on communications can be refined when a disturbing mobile obstacle being considered moves towards an obstacle of the network whose mobility status is considered to be fixed. Indeed, it is very probable in this case that the disturbing mobile obstacle will bypass the fixed obstacle. The taking into account, in the future trajectory of the disturbing mobile obstacle, of the position of the detected fixed obstacle may for example be done on the basis of a storage of previously taken trajectories previously taken by an object (or obstacle) and which would have enabled the object (or obstacle) to bypass the fixed object (or obstacle).

Advantageously, with at least one segment of a future trajectory of the disturbing mobile obstacle being determined from a segment of a prior trajectory of said disturbing mobile obstacle, said at least one future trajectory of the disturbing mobile obstacle is determined as a function of at least one segment of a secondary trajectory bypassing the given position of the fixed obstacle detected, each segment of a secondary trajectory forming a pre-determined angle with said segment of a future trajectory of a disturbing mobile obstacle.

Thus, the estimation of the potential impact of the mobile obstacles on communications can be refined dynamically should a disturbing mobile obstacle considered move towards an obstacle of the network whose status of mobility is considered to be fixed.

Advantageously, the method comprises a step of modifying the routing of at least one communication as a function of said at least one diagnosis made at said step consisting in establishing a forecast diagnostic.

In this way, it is possible to adapt the routing of the communications as a function of the disturbances liable to be caused by the disturbing mobile obstacles within the network, thus preventing a loss of data.

According to an advantageous characteristic, a critical area within the network, for which the presence of at least one obstacle is liable to be disturbing for at least one communication involving a receiver device, is determined by a union of areas of mutual overlapping of at least two disturbed intersecting areas, and said method further comprises the following steps of:

estimating a level of capacity of the receiver device to receive, by analysis of variations of quality of communications traversing said critical area; and adapting the routing of communications of the network to the estimated level of capacity to receive.

According to an advantageous characteristic, the communication or communications whose routing is modified are selected as a function of a weighting associated with devices among said sender and/or receiver devices of the network, said weighting being determined as a function of an estimation of a probability that at least one communication involving said associated device has a level of quality below a pre-determined threshold.

A weighting applied to a device considered represents an estimated level of impact of disturbances detected relative to this device. In other words, a weighting must take account of the future estimated trajectory for the mobile obstacle relative to the position of the device with which the weighting is associated (or relative to communications involving this device). After the set of overlapping areas associated with a given communications link has been determined, it is possible to determine the impact of the mobile object detected as a function of the trajectory that it takes relative to this communication.

Preferably, the step of modifying the routing of at least one communication includes a step for the reinforcing, for a device receiving a data stream, of the communications of this data stream intended for the receiver device.

The invention therefore, in order to reinforce at least one communication with receiver device considered to be in a critical situation, provides for a determining of one or more support relay devices to increase the reception capacity of the receiver device. Such supporting devices then act as a complement to the already established communications paths so as to increase the redundancy of transmission of the data for the given data stream.

It must be noted that this characteristic can be applied in the case of a routing scheme for which the receiver device is a final destination device of a data stream considered. It can also be applied in the case of a routing scheme for which the receiver device is a relay device of a data stream considered.

According to one variant, the step of modifying the routing of at least one communication comprises a step of the determining, for a relay device of a data stream intended for a receiver device, of an alternative relay device of said data stream intended for said receiver device.

In a routing scheme for which said receiver device is a relay device for at least one communication, the receiver device may be replaced by an alternative relay device for one or more communications, the alternative relay possessing a level of capacity to receive that is greater than that of the receiver device. The invention thus provides for a determining of one or more alternating relays capable of supplementing the receiver device considered as being in a critical situation. A relay device for which an alternative relay has been determined then stops being a relay device (at least for a data stream considered).

It can be noted that a relay device (in a critical situation) may have to be replaced by a set of several relay devices in order to enable an efficient relay spatially and temporally within the communications network.

In another embodiment, the invention pertains to a computer program product downloadable from a communications network and/or recorded on a computer-readable carrier and/or executable by a processor. This computer program product comprises program code instructions for the implementation of the above-mentioned method (in any of its different embodiments) when said program is executed on a computer.

In another embodiment, the invention pertains to a computer-readable storage means, possibly totally or partially detachable, storing a computer program comprising a set of instructions executable by a computer to implement the above-mentioned method (in any of its different embodiments).

In another embodiment, the invention pertains to a device for managing communications in a wireless communications network comprising a plurality of sender devices and a plurality of associated receiver devices, each of the sender and receiver devices having a determined area of communications coverage, the coverage areas of each pair having a mutual intersection area. The communications management device comprises:
  first means for determining at least one future trajectory of a disturbing mobile obstacle as a function of a set of prior positions of said at least one disturbing mobile obstacle, a position of an obstacle being determined as a function of areas of mutual overlapping of at least two disturbed intersecting areas, a disturbed intersecting area having a given state of disturbance according to a determined criterion of quality of communications between the devices of the pairs corresponding to said disturbed intersection area; and
  means for establishing a forecast diagnostic of quality of communications by examining the determined future trajectory or trajectories.

The invention proposes a method for managing the routing of communications of a wireless network comprising a set of at least two pairs comprising a sender device and a receiver device. Such a method comprises steps of:
  determining, for a receiver device, a critical area for which the presence of at least one obstacle is liable to be disturbing for at least one communication involving said receiver device;
  estimating a level of capacity of the receiver device to receive, by analysis of variations of quality of communications traversing said critical area; and
  adapting the routing of the communications of the network to the estimated level of capacity to be received.

The general principle of the invention consists in determining a geographical area of the network within a wireless communications network, this geographical area being deemed to be critical for at least one receiver device, wherein one or more obstacles, by their presence, are liable to give rise to disturbances that are damaging for communications in progress with the receiver device concerned.

A geographical area of the network having thus been identified, where the impact of the disturbing obstacles on the capacity of the receiver devices to communicate with other devices of the network is estimated, a routing policy can be undertaken so that the communications bypass (i.e. do not go through) the predefined potential disturbance areas.

The term "capacity to receive" of a receiver device is understood to mean its capacity to be able to communicate acceptably with other device of the network. This characteristic is determined by estimating the progress of the level of quality of communications traversing the critical area as a function of the impact of the disturbing obstacles on these communications.

Advantageously, with each of the devices having a determined communications coverage area, the two coverage areas of each pair having a mutual intersection area, the critical area is determined by a union of overlapping areas, each overlapping area being determined by mutual overlapping of at least two of said intersection areas.

Thus, it is transmission characteristics related to other communications that are used to synthesize these specific one-time results to obtain a consolidated estimation of the level of capacity to receive the communication concerned.

Advantageously, said step of determining at least one critical area comprises at least one of the steps of:
  excluding from said union of overlapping areas at least one overlapping area in which the presence of an disturbing obstacle is detected during a pre-determined duration while said receiver device detects a level of quality of reception that remains higher than a pre-determined threshold during said pre-determined duration;
  including at least one overlapping area in said union of overlapping areas, wherein the presence of a disturbing obstacle is detected during a pre-determined duration while said receiver device detects a remaining level of reception quality that is below a pre-determined threshold during said pre-determined duration.

It is therefore possible, depending on the instantaneous level of reception quality measured by the receiver device concerned, to dynamically refine the constitution of critical areas for each of which the construction is not optimal. Furthermore, it is possible that a change in routing of communications has just been performed or else that the critical area is determined so as to prevent communications difficulties (i.e. the critical area has a part that is not on the communications path with which the critical area is associated and is used to prevent the intrusion of an obstacle in the surroundings of the communication considered). In this case, it may also prove to be necessary to refine the constitution of the critical area.

According to one advantageous characteristic, the level of capacity of said receiver device to receive is estimated as a function of at least one of the two levels belonging to the group comprising:
  a level of instability of the critical area representing a development of disturbances detected in the critical area;
  a level of criticality of the critical area representing an estimated impact of disturbances detected in the critical area.

Indeed, a critical area with an unstable character has a high risk of variations in communications disturbances; thus, communications in progress with the receiver device with which the critical area is associated may be highly impacted by such variations.

Preferably, said step of determining a critical area in which the presence of a disturbing obstacle is detected comprises a step of detecting whether the disturbing obstacle is fixed or mobile by analysis of variations in disturbances of the overlapping areas, detected as being disturbed according to a criterion of quality of link during a pre-determined period.

The impact of the disturbances caused by one or more disturbing obstacles present in the critical area of the network may therefore be estimated as a function of the fixed or mobile character of the obstacles. For example:

if no disturbing obstacle is detected, the state of instability of the area may be considered to be stable and the criticality low;

if a disturbing fixed obstacle is detected in a critical area, the state of instability of the area may be considered to be stable and the criticality high; and if a disturbing mobile obstacle is detected in the critical area, the state of instability of the area may be considered to be unstable and the criticality very high.

Preferably, the method comprises a step of checking that, during a pre-determined period, the level of capacity of said receiver device to receive is above a pre-determined threshold, and the step of adapting the routing of the communications is performed only in the event of a negative check.

The invention advantageously provides for an estimation of the duration of a disturbance caused by an obstacle in order to prevent a reconfiguration of the communications which ultimately will not be necessary if the disturbance in the critical area should be only a specific one-time disturbance or should it act only at the edges of the critical area for example.

Consequently, the invention also prevents any untimely reconfiguration of communications which would bring about instability for the communications network.

Advantageously, the step of adapting the routing comprises a step which, in a routing scheme for which said receiver device is a relay device for at least one communication, is a step of replacing said receiver device by at least one alternative relay device for said communication or communications, said alternative relay device or devices possessing a level of capacity to receive that is greater than that of said receiver device.

In a routing scheme in which a receiver device, considered to be critical (owing to an insufficient capacity to receive) is a relay device, the invention provides for adapting the routing of the communications by replacing the receiver device by an alternative relay device likely to be capable of supplementing the receiver device. A relay device for which an alternative relay device has been determined then stops being a relay device (at least for a data stream considered). It may be noted that a relay device (in a critical situation) may have to be replaced by a set of several relay devices in order to enable a relay that is spatially and temporally efficient within the communications network.

Thus, through the use of another communications path or paths, the invention averts a loss of data following disturbances caused by the presence of disturbing obstacles (and their fixed or mobile character). In one alternative embodiment, the step of adapting the routing comprises a step of increasing a number of copies of a same set of data sent to said receiver device.

The invention therefore, in order to reinforce at least one communication to a receiver device considered to be in a critical situation (owing to an insufficient capacity to receive), provides for increasing the redundancy of transmissions of data (for the data stream considered) to the receiver device. Other communications paths therefore complement already established paths.

It is noted that the reinforcing of the transmission redundancy can be applied in routing scheme for which the receiver device is a final destination device (of a data stream considered). The reinforcing of the transmission redundancy can also be applied in a routing scheme for which the receiver device is a relay device (of a data stream considered) for a final destination device (or any other relay device of the data stream considered).

The adapting of the routing of the communications can differ depending on the type of device with which the critical area is associated for a given routing scheme. It may be a receiver device, which is a final destination for a data stream considered and, in this case, the routing is adapted by the use of another communications path or by the reinforcing of the redundancy of transmission of data to this device. Or else again, it may be a relay device and, in this case, the adapting of the routing is done by the use of an alternative relay device (this device being capable of receiving the data stream acceptably, i.e. being capable of fulfilling the function of a relay in place of the relay device considered) or by redundancy of transmission of data (for the data stream considered).

In another embodiment, the invention pertains to a computer program product downloadable from a communications network and/or recorded on a computer-readable carrier and/or executable by a processor. This computer program product comprises program code instructions for the implementation of the above-mentioned method (in any of its different embodiments) when said program is executed on a computer.

In another embodiment, the invention pertains to a computer-readable storage means, possibly totally or partially detachable, storing a computer program comprising a set of instructions executable by a computer to implement the above-mentioned method (in any of its different embodiments).

In another embodiment, the invention pertains to a device for managing the routing of communications of a wireless network comprising a set of at least two pairs comprising a sender device and a receiver device. Such a device for managing communications routing comprises:

first means for determining, for a receiver device, a critical area for which the presence of at least one obstacle is liable to be disturbing for at least one communication involving said receiver device;

means for estimating a level of capacity of the receiver device to receive, by analysis of variations of quality of communications traversing said critical area; and means for adapting the routing of the communications of the network to the estimated level of capacity to be received.

5. LIST OF FIGURES

Other features and advantages of the invention shall appear from the following description, given by way of an indicative and non-restrictive example and from the appended drawings, of which:

FIG. 1 illustrates an example of a wireless communications network in which it is possible to implement the method of managing according to a particular embodiment compliant with the invention;

FIG. 2 presents the schematic structure of a communications device implementing the method of managing according to a particular embodiment compliant with the invention;

Figure 19:
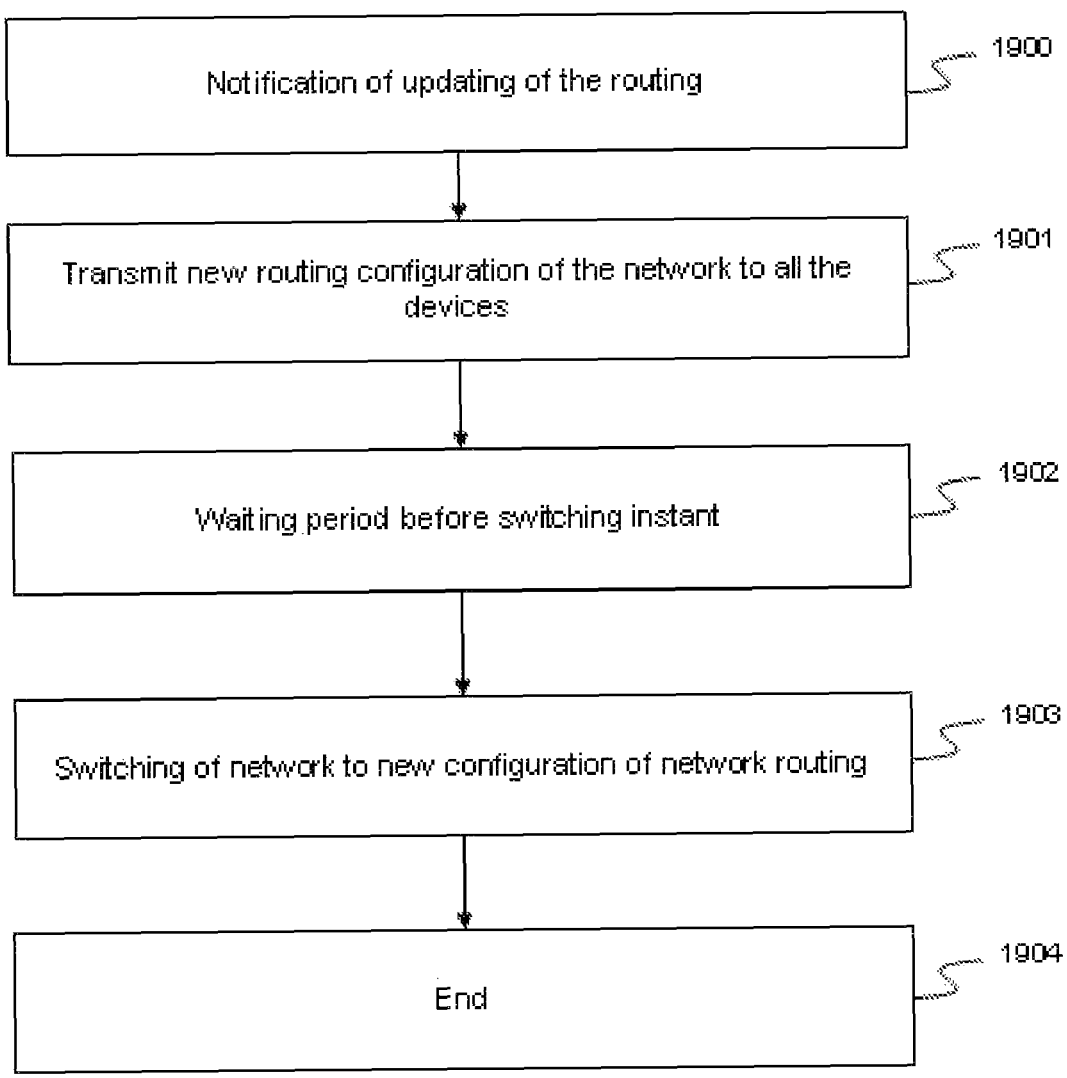

FIG. 19 relates to the algorithm for updating the routing of the network according to a particular embodiment of the invention.

6. DETAILED DESCRIPTION

In all the figures of the present document, the identical elements and steps are designated by a same numerical reference.

Figure 1:
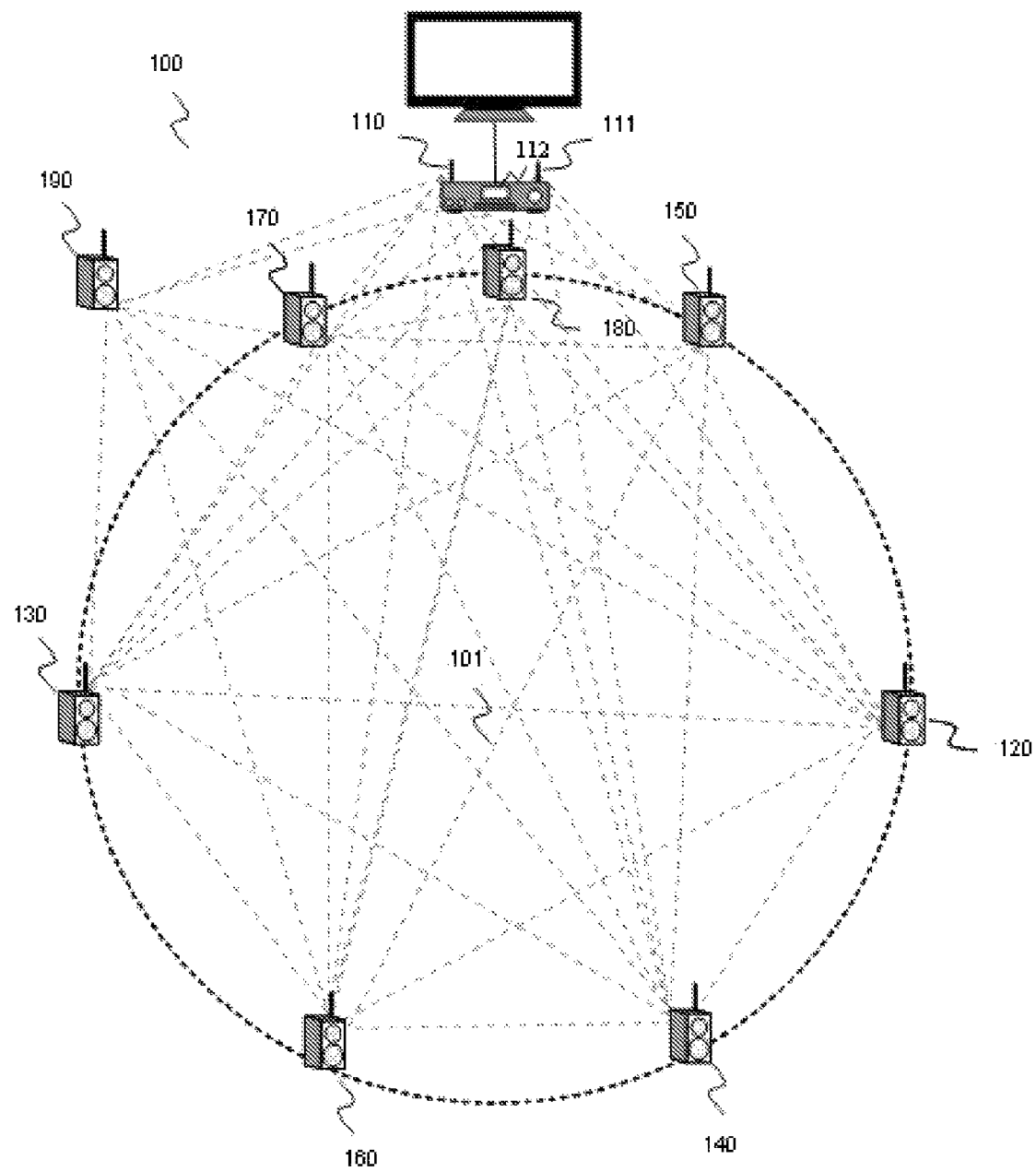

Referring now to FIG. 1 we present an example of a wireless communications network 100 in which the method of management, according to a particular embodiment compliant with the invention, is implemented.

More particularly, the network 100 of FIG. 1 illustrates a wireless 7.1 audio communications system of the home cinema type for example, comprising a source device 112 having two transmit antennas 110 and 111 as well as a plurality of sender and receiver devices 120, 130, 140, 150, 160, 170, 180 and 190, each device being capable of behaving alternately as a sender device and as a receiver device and having only one antenna for the transmission and reception of radio data signals. Furthermore, certain nodes may play the role of relay nodes, i.e. they retransmit on the network data that they have preliminarily previously received from another node. The devices of the network are all interconnected by radio communications links 101. Even if the radio signals can be broadcast in every direction, it can happen that certain relay or receiver nodes cannot detect these radio signals owing to the presence of obstacles. A radio link is therefore not necessarily present between a sender device and any other receiver device of the network. In order to restrict the phenomenon of shadowing and provide information redundancy (the aim of which is to facilitate the decoding of data by a receiver device), relay devices are defined in the network to relay the data transmitted by a sender device.

It must be noted that the following description illustrates a particular embodiment of the invention, certain initial assumptions of which have to be taken into account. Indeed, the topology of the communications network 100, i.e. the relative spatial position of the devices 120, 130, 140, 150, 160, 170, 180 and 190, is deemed to be known to each of the devices 120, 130, 140, 150, 160, 170, 180 and 190 of the network 100. The topology of the network 100 may effectively be known in advance by each of the devices 120, 130, 140, 150, 160, 170, 180 and 190 because a predefined network installation 100 is necessary for certain recommendations of the configuration as laid down by a standard (such as for example the ITU-R BS.775-2 standard adapted for a 7.1 type audio system) or because of the capacity of the devices of the network 120, 130, 140, 150, 160, 170, 180 and 190 to compute their distances and angles relative to each of the other devices of the network 100.

Here below in the present description, it is therefore assumed that topological knowledge of the network 100 by each of the devices 120, 130, 140, 150, 160, 170, 180 and 190 included in this network is induced by the standardization of the installation of the communications network 100.

Furthermore, the particular embodiment described here below intended for home cinema type communications networks is given by way of an illustrative example. It is clear that many other embodiments of the invention can be envisaged, without departing from the context of the invention.

During the transmission of radio data, the data stream is formed by a plurality of data blocks and is conventionally protected against transmission errors by means of an error correction code. Generally, the data blocks of the data stream are grouped together in packets in a sender device, each packet being then encoded so as to generate a plurality of parity blocks representing redundant information. A receiver device of the network 100 receiving the data packets through the different radio communications links then carries out a decoding. This decoding step then consists in correcting the errors in the data blocks received by the receiver device, using the parity blocks to do this.

The relay devices for their part carry out the transfer of data packets encoded as such without decoding or again encoding the data streams. Indeed, the execution of the decoding and encoding at each relay device would use up all the memory needed for the temporary storage of the packets and would also increase the transmission time while at the same time unnecessarily consuming computation resources.

Furthermore, to transmit a stream of data pertaining to an audio stream, a video stream or to a combination of the two, a protocol such as the one described by the IEEE 802.15.3 standard may, for example, be implemented. Apart from the fact that it permits very high bit-rates (in its 802.15.3c version), owing to a transmission of data in the 57-64 GHz frequency band, this protocol offers each of the network devices the possibility of benefiting from a guaranteed time of access to the guaranteed shared wireless communications medium by using time division multiplexing (TDM) providing for a division of the time domain into a plurality of recurrent time slots of fixed length, also called a TDM sequence or cycle. Multiplexing of this kind enables certain parameters such as latency time or data bit rate to remain non-variant.

Figure 2:
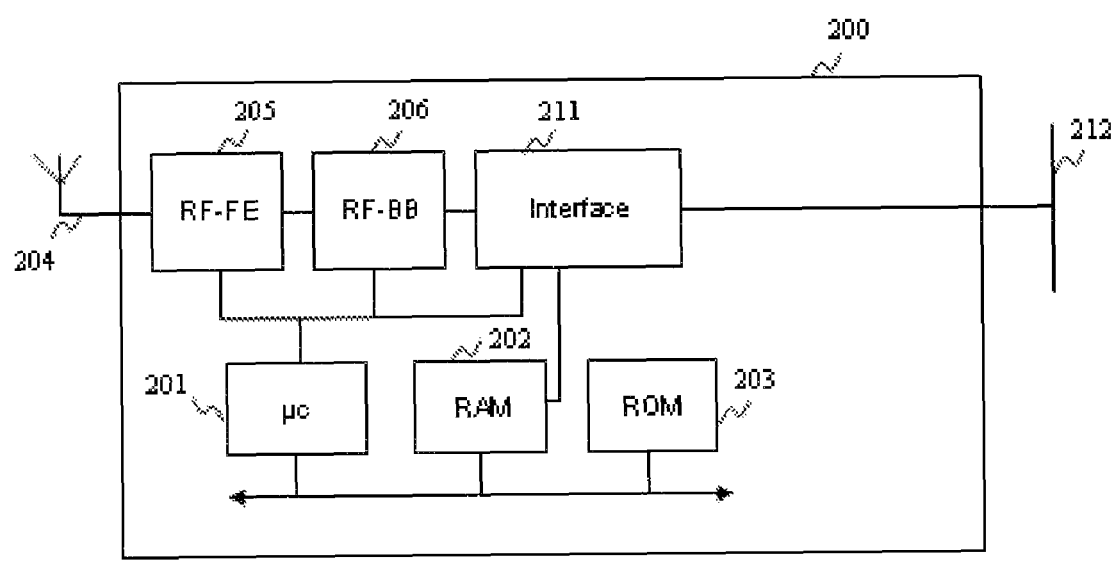

FIG. 2 shows the schematic structure of a communications device 200 of the communications network 100 implementing the method for managing routing of communications according a particular embodiment of the invention.

More specifically, the communications device 200 is integrated into each of the sender or receiver devices (120, 130, 140, 150, 160, 170, 180) or into any relay device of the communications network 100, and can behave both as a sender device and as a receiver device.

The communications device 200 comprises:
- a RAM (Random Access Memory) 202 working as a main memory;
- a computation block 201 or CPU (Control Process Unit) whose capacity can be extended by an optional random-access memory connected to an expansion port (not shown in FIG. 2). When the communications device 200 is powered on, the CPU unit 201 is capable of executing instructions pertaining from the ROM 203. After the system has been powered on, the CPU 201 is capable of executing instructions from the RAM 202 pertaining to a computer program, once these instructions have been loaded from the ROM 203 or from an external memory (not shown in the present FIG. 2). A computer program of this kind, if executed by the CPU 201, prompts the execution of a part or of the totality of the steps of the algorithms described here below with reference to FIGS. 5a, 5b to 10 and 13 to 19;
- a block 205 (referenced RF-FE for RF Front-End) responsible for matching the output signal of the base-band block 206 (referenced RF-BB for RF Base-Band) before it is sent out by means of an antenna 204. For example, the matching can be done by frequency transposition and power amplification processes. Conversely, the block 205 also enables the matching of a signal received by the antenna 204 before it is transmitted to the base-band block 206. The base-band block 206 is responsible for modulating and demodulating the digital data exchanged with the block 205;
- an input/output interface block 211 connected to a communications network 212.

In one particular embodiment, the method of the invention can be implemented in a centralized way, i.e. by a central device implementing communications management algorithms and deciding alone about allocations of resources made to the different communications. The term central device (or control device) is understood to mean a device of the network implementing centralized management of the algorithms for implementing the invention or more generally the network.

In one particular embodiment as a variant, the method of the invention can be deterministic and can therefore be implemented in a distributed way, i.e. by a set of devices independently of one another.

Figure 3:
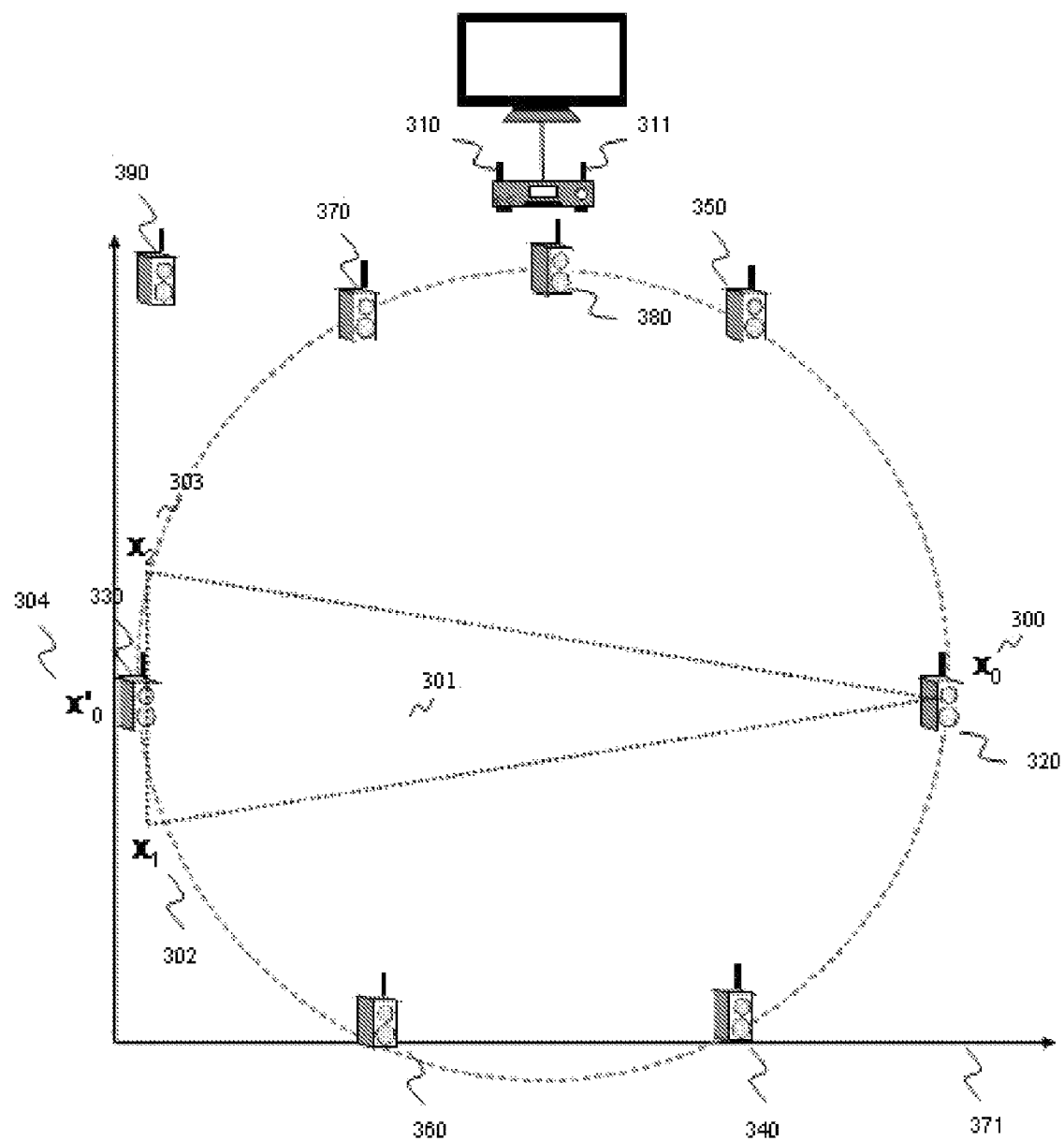
FIG. 3 illustrates a schematic example of a area of intersection of coverage obtained for a pair of sender and receiver devices communicating in a communication network according to a particular embodiment of the invention.

Referring now to FIG. 3, we present a schematic example of a coverage intersection area 301 obtained by a pair of sender/receiver devices 330, 320 communicating in a communications network according to a particular embodiment of the invention.

More particularly, the communications network is a wireless communications network of a home cinema type comprising a source device 312 with two transmission antennas 310 and 311 as well as a plurality of sender or receiver devices 320, 330, 340, 350, 360, 370, 380 and 390, each of the devices possibly playing the role of a relay device (whose principle is recalled further above with reference to FIG. 1).

We shall now consider the device 330 of the network as a sender device, sending with a sending angle of 180°, i.e. covering the entire network, and the device 120 as the associated receiver device. The sender device 330 has a quasi-omnidirectional antenna (relative to the size of the communications network) whose associated coverage area (not shown in the figure) is estimated to be the one produced by a 180° angle between the axes $(x'_0\ 330, x_1\ 302)$ and $(x'_0\ 330, x_2\ 303)$. The receiver device 320 has a directional antenna whose major selectivity lobe is represented by the coverage area 301 of its receive antenna corresponding to the space situated between the axes $(x_0\ 300\ x_1\ 302)$ and $(x_0\ 300\ x_2\ 303)$. The coordinates of the vertices $x_0\ 300$, $x_1\ 302$ and $x_2\ 303$ are defined in a predefined reference system 371 as a function of the configuration of the communications network.

Should the communications network be used in a home cinema type of sound broadcasting system, the configuration may be predefined at the time of manufacture in the plant or provided by a user when the system is initialized. This makes the user capable of selecting a configuration matched to his environment. In any case, the configuration of the devices is preliminarily defined and a common location reference is used by the devices of the network.

The used location reference system is known to each of the devices of the network in the same way as the topology of the network. Thus, the receiver device 320 is sensitive to (i.e. it can estimate) any loss of power of the signal sent out by the source device 330 detected in the coverage area at reception 301.

For the sake of clarity here below in the description, a coverage reception area shall be likened to a coverage intersection area for a pair of sender/receiver devices. In reality, an intersection area is an intersection between a sending coverage area and a reception coverage area.

This coverage intersection area 301 (obtained by considering the angle between the axes $(x'_0\ 304, x_1\ 302)$ and $(x'_0\ 304, x_2\ 303)$ to be equal to 180° furthermore permits an indeterminate positioning of the sender device 330 about a standardized position, to the extent that it remains between the points $x_1\ 302$ and $x_2\ 303$ enabling the receiver device 320 to detect a loss of power, if any, of the signal sent by the sender device 330.

An alternative embodiment consists in defining a sending coverage area with an angle between the axes $(x'_0\ 304, x_1\ 302)$ and $(x'_0\ 304, x_2\ 303)$ of less than 180° degrees (if it were to be more than 180°, then that would amount to considering it to be 180°. This angle is defined by the sender antennas of the communications devices of the network and is appreciably the same for all the devices of the network. This is also the case for the angles in reception. Each node then has knowledge of it. If not, it is possible for those skilled in the art to provide for a configuration data exchange protocol that can be implemented between all the devices of the network in order to exchange the angle values pertaining to the coverage areas of the transmit and/or receive antennas.

In short, through the detection of a loss of power of the signal received from a sender device of the network, the power of the signal being measured and compared with a theoretical no-load power, i.e. under ideal conditions of transmission (with neither obstacles or disturbances), a receiver device of the network is capable of detecting the presence of an obstacle or of a disturbing object in the coverage intersection area 301 pertaining to the sender device.

Here below, a coverage intersection area at which a loss of power is detected will be designated as a disturbed area.

In a particular embodiment of the present invention, each of the devices of the network performs a measurement of the power of the radio signal for each of the coverage intersection areas pertaining to each of the sender devices of the network and then transmits the results of these measurements to a central device of the network. The term central device (or control device) is understood to mean a device of the network implementing centralized management of the algorithms for implementing the invention or more generally the network.

In a first embodiment taken as a variant, since the method of the invention is deterministic, it may be implemented by a set of devices of the network independently of one another. It is only necessary for all the devices to receive the information on the state of disturbance (i.e. whether an intersection area is considered to be disturbed or not disturbed) pertaining to the coverage intersection areas coming from other devices of the network.

In a second embodiment taken as a variant, the method of the invention can also be implemented by a device dedicated solely to forecast diagnostics, that is not an integral part of the "transmission" part of the network (such as an independent manager device for example). This dedicated device may be adapted to the reception of information from the network (on the statuses of disturbance of the coverage intersection areas). However, it may be that it is not adapted to sending radio signals on the network and that it does not participate in the defining of coverage intersection areas, although it is a reception device in the strict sense of the term.

In one particular embodiment, the central device of the network then makes a correlation of the power measurements in order to determine the presence or absence of disturbed overlapping areas, an overlapping area being an area of intersection between at least two coverage intersection areas. An example of an overlapping area is illustrated here below with reference to FIG. 4.

Figure 4:
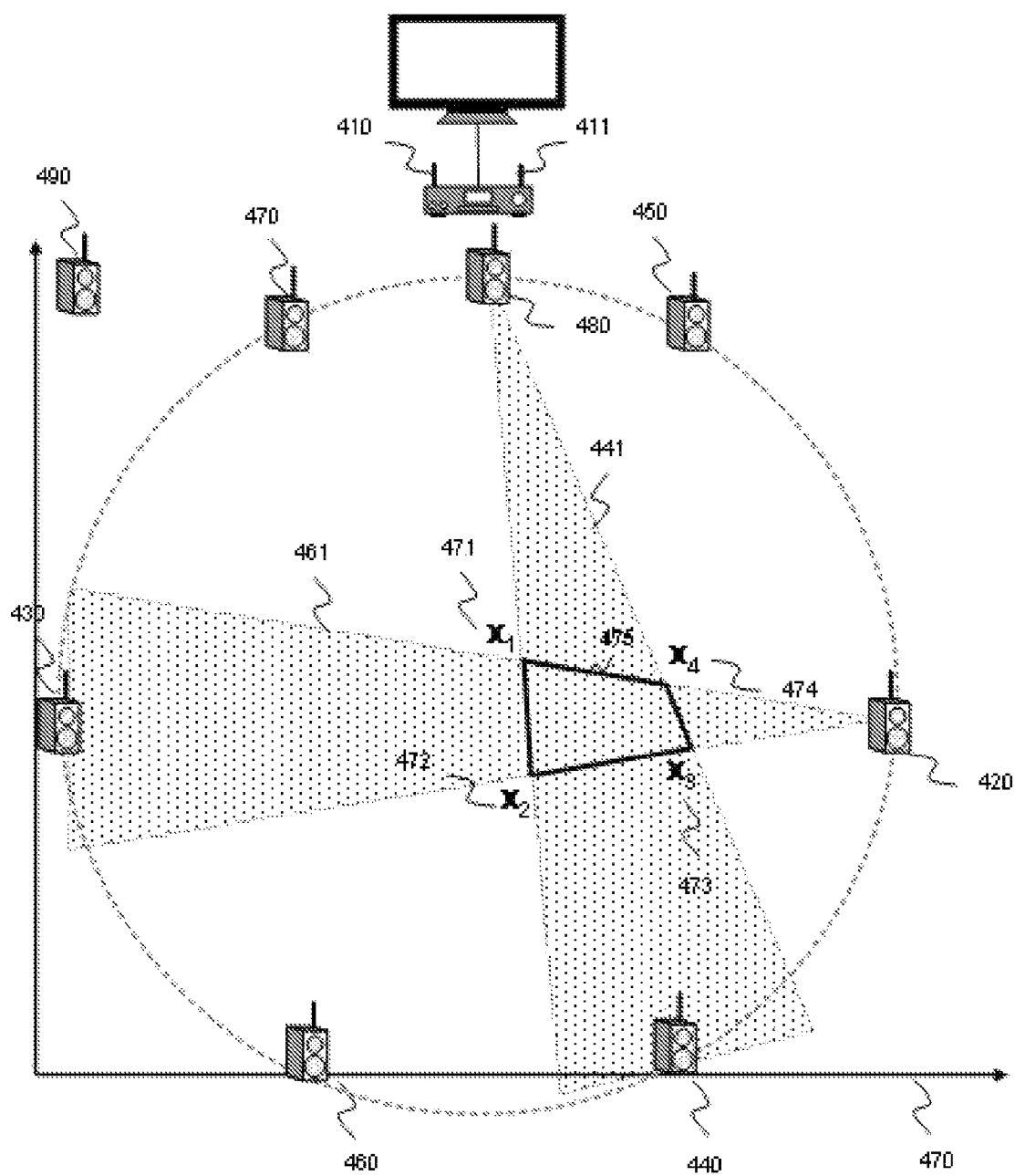
FIG. 4 illustrates a schematic example of an overlapping area obtained from two pairs of sender/receiver devices according to a particular embodiment of the invention.

FIG. 4 illustrates an example of an overlapping area in a wireless communications network according to one particular embodiment of the invention.

In a manner similar to FIGS. 1 and 3, it is assumed that the communications system of FIG. 4 is a wireless communications system of the home cinema type comprising a source device 412 with audio and/or video content having two transmit antennas 410 and 411 as well as a plurality of sender or receiver devices 420, 430, 440, 450, 460, 470, 480 and 490, capable of playing the role of a relay device (according to the principle set forth further above with reference to FIG. 1). In the present case, we also consider two coverage intersection areas 441 and 461 pertaining to the two sender/receiver pairs respectively 480/440 and 430/420.

The central device of the network determines the coordinates of the vertices $x_1$ 471, $x_2$ 472, $x_3$ 473 and $x_4$ 474 of the overlapping area 475 (here below also called an overlapping polygon) of the coverage intersection areas 441 and 461. If the coverage intersection areas 441 and 461 each have a high level of disturbance, the overlapping polygon 475 can then correspond to an area in which there is an object which is disturbing for the communications of the two coverage intersection areas 441 and 461. It is then possible to refine the determining of the size of the overlapping polygon 475 in considering the intersection of the overlapping polygon 475 with at least one other disturbed area if this is the case.

It must be noted that such a method for determining an overlapping area 475 can be based, for example, on the polygon intersection algorithm or polygon clipping algorithm known as the Weiler-Atherton algorithm.

Figure 5A:
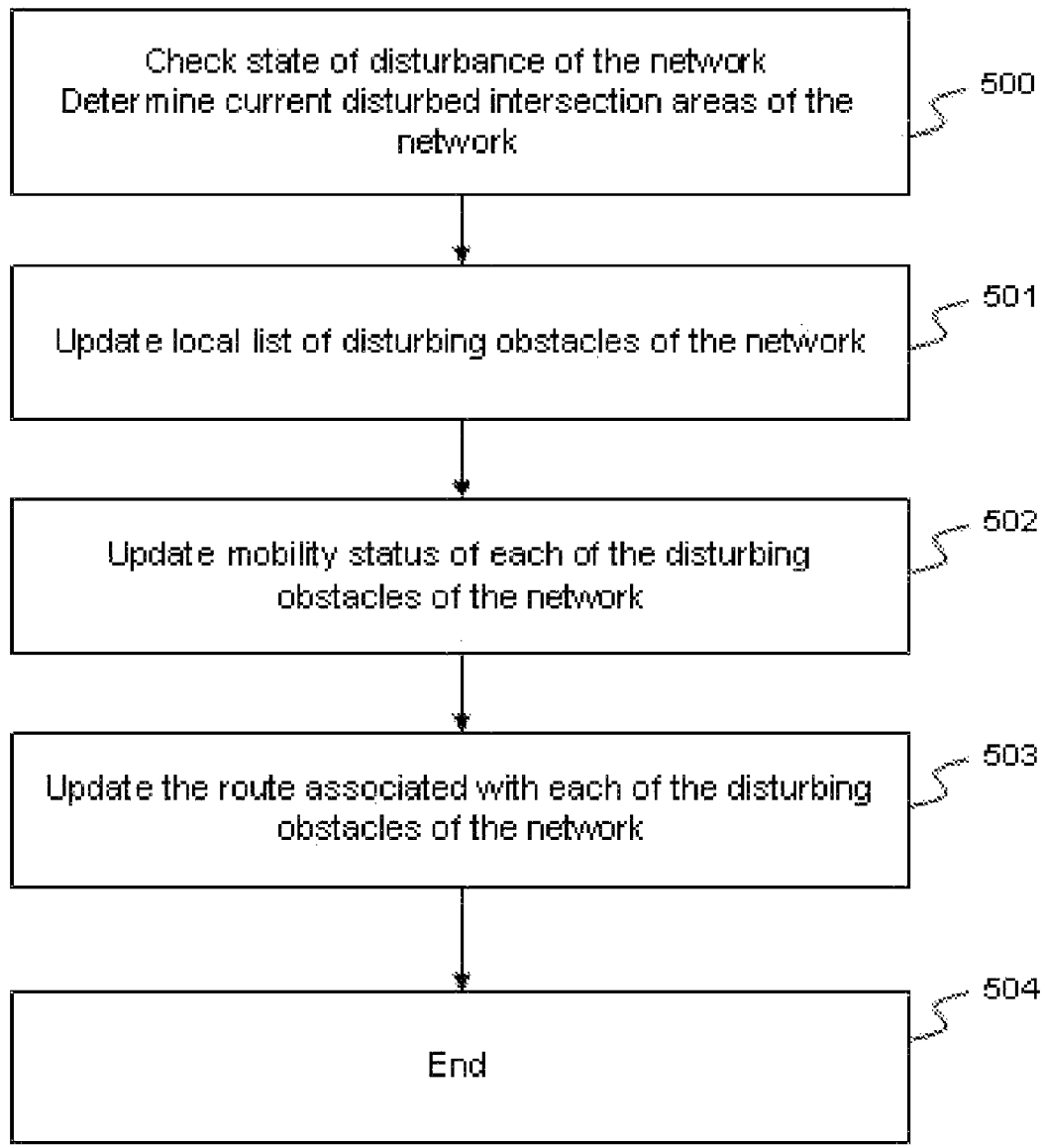
FIG. 5a is a flowchart of an algorithm for the management of disturbing mobile objects according to a particular embodiment of the invention.

FIG. 5*a* is a flowchart of an algorithm for the management of disturbing mobile obstacles according to a particular embodiment of the invention. The implementation of such an algorithm enables a device 200 of the network to locate the set of disturbing obstacles, i.e. objects that might prompt masking phenomena between a sender device and one or more receiver devices or relay devices and enables the differentiation, among these obstacles, of the mobile obstacles from the fixed obstacles.

A disturbing mobile obstacle is considered to be critical for a communications network through the dynamic nature of the disturbance that it causes.

Thus, in a first step 500, a device 200 of the network implementing the present invention verifies the state of disturbance of the communications network by means of a mechanism for detecting current disturbed areas of the network based on a criterion of quality of link. A method relying on the determining of coverage areas, intersection areas and overlapping areas of the network (the principle of which is presented further above with reference to FIGS. 3 and 4) for example, may be implemented to make a current diagnosis of the state of disturbance of the network.

Once the current state of disturbance of the network has been obtained, the device 200, in a second step 501, then compares the current state of disturbance of the network obtained with a previously determined state of disturbance of the network.

In a particular embodiment of the invention, the verification of the state of disturbance of the network can be done periodically.

From the previous step of comparison 501, the device 200 then updates a local figurative table of the disturbing obstacles of the network. The local table contains data blocks each corresponding to a disturbing obstacle of the network and presents:

- a unique disturbing obstacle identifier used to identify each of the disturbing obstacles of the network uniquely at the device 200;
- a piece of information on the position of the disturbing obstacle using coordinates of the vertices of the overlapping polygon 475 (or of the overlapping area) in which the disturbing obstacle was detected. This information will be hereinafter called a form associated with the disturbing obstacle;
- a piece of information on the mobility status of the disturbing obstacle specifying whether the disturbing obstacle is considered to be mobile, fixed or having restricted mobility;
- a piece of information on the current route of the disturbing obstacle representing a route traversed within the coverage area of the network, each route being determined by a means of prior positions of the corresponding obstacle preliminarily memorized in the local table.

It must be noted, by way of non-exhaustive examples, that the position of a disturbing obstacle (a prior or current obstacle) can be obtained, by using shapes of the overlapping area where the disturbing obstacle considered was detected, from the coordinates of the barycenter of the previous shapes of the disturbing obstacle considered. The position of a disturbing obstacle may be determined by defining a circular area whose center is the barycenter of a shape of an overlapping area where the disturbing obstacle concerned has been detected and whose radius has a predefined maximum length $R_{max}$ corresponding to a maximum discrepancy of positioning permissible for a given trajectory of the disturbing obstacle of the network. This maximum discrepancy for example may be set at 50 cm should the network 100 considered be the communications network as described in FIG. 1.

The updating of a local table of this kind then consists of the storage of a new disturbing obstacle in the local table or the updating of the information on the shape or mobility status associated with one or more disturbing obstacles already present in the local table.

To this end, the device of the network 200 makes a check, for each overlapping area resulting from the step 500 of the present algorithm, to see whether this area is considered to be adjacent and whether it overlaps the overlapping area representing the shape associated with a disturbing obstacle present in the figurative local table of disturbing obstacles of the network. Two areas are said to be adjacent if they have a common ridge. A first overlapping area overlaps a second overlapping area if the coordinates of the second overlapping area are included in the first overlapping area. If this is the case, the shape associated with the corresponding disturbing obstacle is updated. Indeed, if the overlapping area resulting from the step 500 is adjacent to another overlapping area or if it overlaps the shape associated with a disturbing obstacle present in the figurative local table of the disturbing obstacles of the network, the overlapping area resulting from the step 500 becomes the new shape associated with the disturbing obstacle of the local table. If the overlapping area resulting from the step 500 corresponds to current shape associated with the disturbing obstacle of the figurative local table of the disturbing obstacles of the network, the new shape associated with the disturbing obstacle of the local table then becomes the union of the overlapping area resulting from the step 500 and the current shape associated with this disturbing obstacle of the local table.

Should a overlapping area resulting from the step 500 have no adjacency with any other overlapping area, or with any overlapping region or any region that corresponds to the current shape of a disturbing obstacle present in the figurative local table of disturbing obstacles of the network, then a new disturbing obstacle is deemed to have been detected and a new data block is added to the local table, with which the following are associated:

a new unique disturbing obstacle identifier;
a shape corresponding to the overlapping area resulting from the step 500; and
a fixed mobility status corresponding to an unmoving disturbing area (here below also called a fixed obstacle).

It must be noted that with respect to the notion of adjacent overlapping areas, it may be worthwhile to introduce the notion of a "minimum adjacency distance" $\delta_{min}$, such that if two points of two distinct overlapping areas are at a distance from each other of less than $\delta_{min}$, then the two distinct overlapping areas are then considered to be adjacent.

Once the list of disturbing obstacles of the network has been updated in the step 501, the algorithm, in a step 502, then updates the mobility status of each of the disturbing obstacles present during the initiation of the step 500 in the figurative local table of the disturbing obstacles of the network. To this end, a comparison is made for each of the disturbing obstacles of the local list between its associated shape before the step 500 and its newly updated shape newly updated at the end of the step 501. Several cases can arise:

if the shapes are different (i.e. if at least one of the vertices of an overlapping polygon is not common to another overlapping polygon), the disturbing obstacle is considered to be in motion and its mobility status is said to be mobile (here below it is also called a "mobile obstacle").

if the shapes are identical (i.e. if the two overlap polygons possess exactly the same vertices), then the following cases have to be considered;

if the previously obtained mobility status of the disturbing obstacle considered is "mobile", then a mobility counter is activated and the mobility status of the disturbing obstacle then becomes a status of "restricted mobility". The mobility counter, once activated, is incremented at each iteration of the step 502;

the previously obtained mobility status of the disturbing obstacle considered is "fixed", the status of the disturbing obstacle remains "fixed";

the previously obtained mobility status of the disturbing obstacle considered is that of "restricted mobility", the value of the mobility counter is then compared with a maximum time-out threshold $T_{max}$. If the value of the counter is below a threshold $T_{max}$, the mobility status of the disturbing obstacle remains that of "restricted mobility". If the value of the counter is greater than or equal to the threshold $T_{max}$, the disturbing obstacle is then considered to be unmoving and its mobility status becomes "fixed". The mobility counter is then reset and stopped. The mobility counter is also reset and stopped when the current shape determined at the step 5001 is different from the shape previously associated with the disturbing obstacle.

Finally, in a step 503, the present algorithm updates a piece of information representing the route traversed by each disturbing obstacle present in the local table by adding the current position of the disturbing obstacle to its previous positions.

Once the step 503 is completed, the algorithm makes a transition to a step 504 to end the algorithm for managing disturbing mobile obstacles.

Figure 5B:
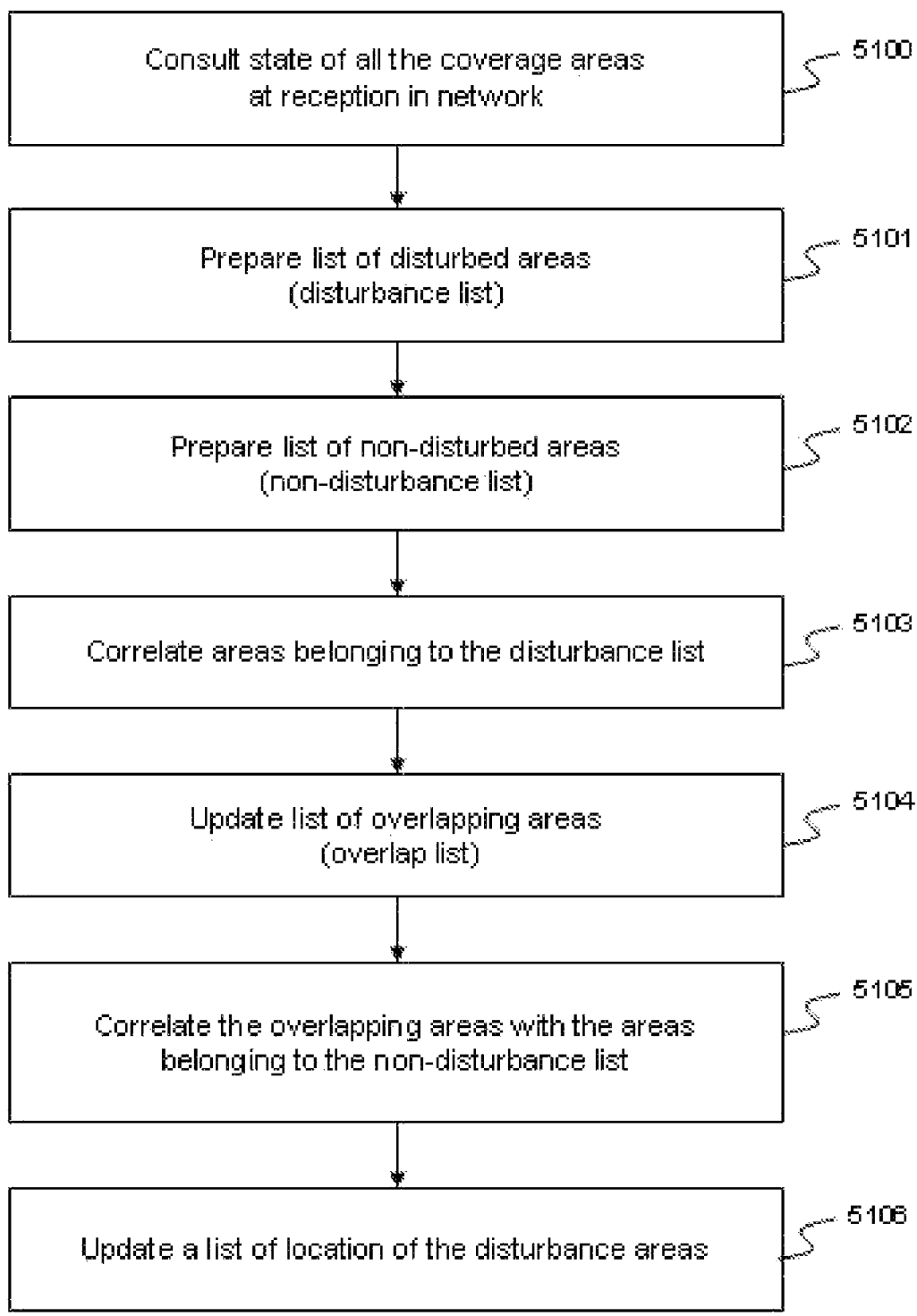
FIG. 5b is a flowchart of an algorithm for locating areas with a presence of objects according to a particular embodiment of the invention.

FIG. 5b is a flowchart of an algorithm for locating areas with a presence of objects according to a particular embodiment of the invention.

This algorithm gives a detailed description of the implementation of the steps 500 and 501 already described with reference to FIG. 5a in the context of a communications network such as the network 100 described with reference to FIG. 1.

Each receiver device of the network can determine the level of quality of a link (or communications link) that it has at its disposal with a sender device when this sender device sends out a signal with an omnidirectional antenna configuration and sends it to the other devices of the network through control data blocks.

Each receiver device of the network can determine the level of quality of a link (or communication) that it has with a sender device when this sender device sends a signal with an omnidirectional antenna configuration and transmits it to the other devices of the network through the control data blocks.

Once the information on the state of disturbance of the coverage intersection areas of the network has been collected, as transmitted on the network by the receiver devices, the locating algorithm can be implemented in order to locate the areas with presence of at least one object (or obstacle) in the coverage area of the network, this object (or obstacle) causing disturbances within the network. In such a case, the algorithm enables the definition of the position, relative to the devices of the network, of a polygonal area within which the disturbing obstacle is situated.

In a first step 5100, all the coverage intersection areas of the network are sorted out as a function of their respective state of disturbance as received from the receiver devices of the network. Then, in a step 5101, a list is drawn up of all the disturbed areas (called a "disturbance list") and then, in a step 5102, a list is drawn up of all the undisturbed areas (called a non-disturbance list).

In a step 5103 of the algorithm, the central device of the network then, for each coverage intersection area present in the disturbance list, performs a correlation by polygonal intersection with all the other coverage intersection areas present in the disturbance list, in compliance with the mechanisms referred to here above with reference to FIG. 4.

The set of overlapping areas per polygonal intersection this obtained is then stored in a list of overlapping areas in a step 5104.

In a step 5105 of the algorithm, for each overlapping area stored in the list of the overlapping areas, a correlation is made by polygonal subtraction with the set of non-disturbance areas present in the non-disturbance list. A correlation of this kind by polygonal subtraction can be done for example by means of the "half-line algorithm" known to those skilled in the art.

The set of overlapping areas by polygonal subtraction thus obtained corresponding to the areas with a presence of disturbing objects (here below also called location areas) is then stored in a location list during the step 5106 of the present algorithm.

Each location area of the location list thus updated then corresponds to the relative positioning of disturbing objects of the network relative to the sender, receiver or relay devices of the network.

The obstacle is detected by application of the algorithm described here above with reference to FIG. 5b as an overlapping area or a set of overlapping areas possibly diminished by one or more overlapping areas. For the sake of simplicity, the area with a presence of an obstacle detected will be likened to an overlapping area.

Figure 6:
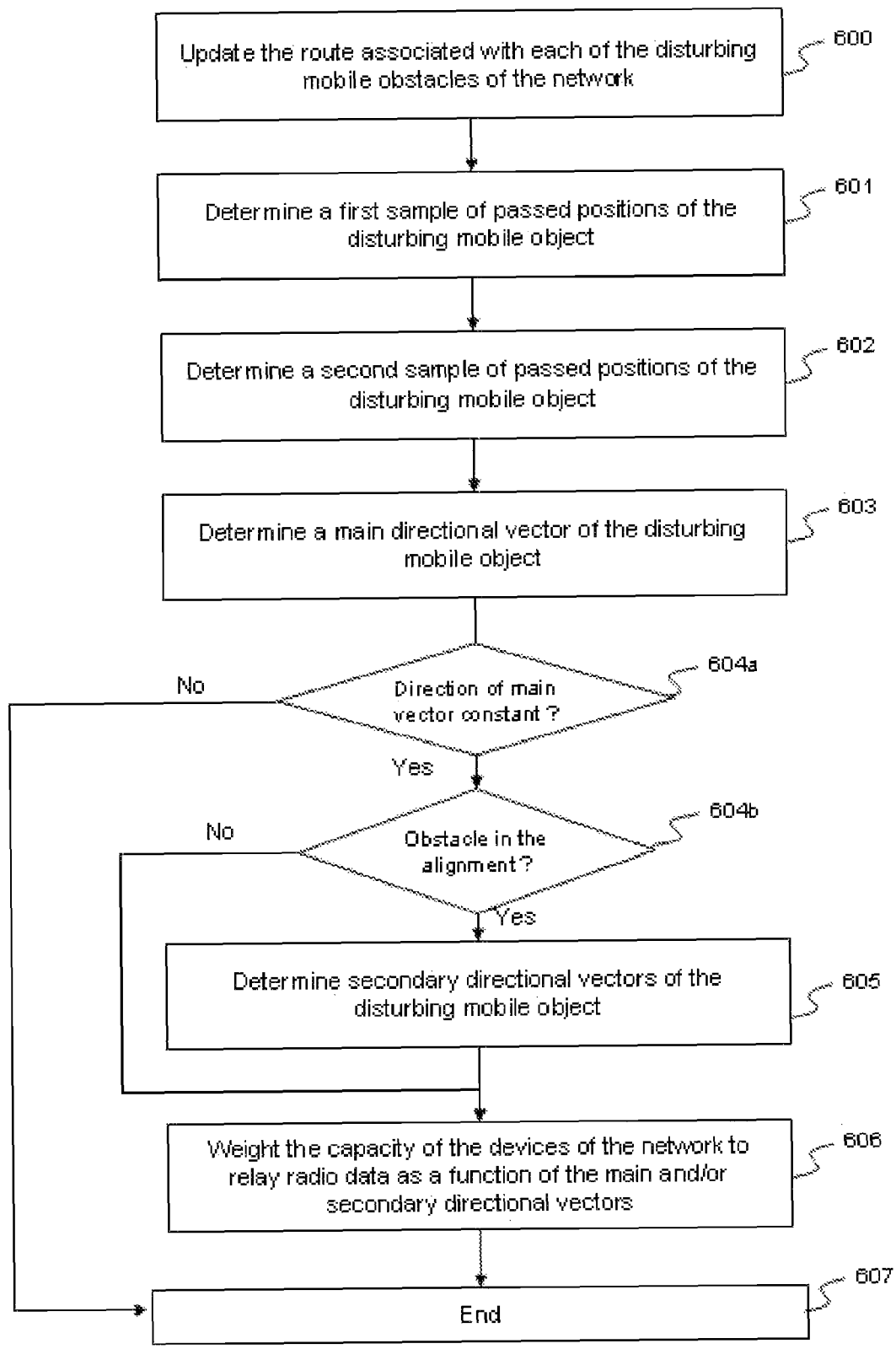
FIG. 6 is a flowchart of an algorithm for estimating a trajectory of disturbing mobile obstacles according to a particular embodiment of the invention.

Referring now to FIG. 6, we present a flowchart of an algorithm for estimating a trajectory of disturbing mobile obstacles according to particular embodiment of the invention.

The implementation of such an algorithm makes it possible, by analysis of the route traversed by a disturbing mobile obstacle, to quantify the impact of the future disturbances caused by this obstacle. In other words, it enables the preparation of forecast diagnostics of disturbance of the network making it possible to make forecasts on which communications links of the network are liable to be disturbing by this disturbing mobile object.

Once the route traversed by a disturbing obstacle has been updated 600 (as described further above with reference to the step 503 of FIG. 5a), the algorithm of FIG. 6 then, in a step 601, makes a first selection of a first sample of passed positions of the disturbing mobile obstacle corresponding to the route traversed.

In the context of the present invention, the term "passed positions" is understood to mean the barycenter of the previous overlapping polygons for a disturbing mobile obstacle.

From this first sample of passed positions, the algorithm then, in a step 602, selects a sub-set representing the first sample, called a second sample of passed positions. By way of an example, it could be the last ten passed positions of a disturbing mobile obstacle. The algorithm may also be more restrictive in its choice of a sample of passed positions, for example by computing the mean standard deviation of each of the positions passed on a mean trajectory and by excluding the points deemed to be too distant from this mean trajectory given the previously calculated mean standard deviation.

In a step 603, the algorithm then determines a mean directional vector (here below a "main directional vector" and $\Delta$ denotes the straight line supporting the main directional vector) in taking account of the second selected sample of passed positions.

In a step 604a, the algorithm makes a check to see if the direction of the main directional vector may be considered to be constant. To this end, the invention considers the current angle $\alpha(n)$ formed by the main direction vector (newly computed at the step 603) and a given directional reference (such as a fixed Y-axis straight line in the shared referential system).

A mean variation of the current angle $\alpha(n)$ relative to the passed positions of the second sample is then computed. If the mean variation is smaller than a maximum deviation value $\alpha_{max}$, the direction of the main directional vector of the disturbing mobile obstacle is considered to be constant.

In one particular embodiment of the invention, the value of $\alpha_{max}$ may be set at 5 degrees.

If the direction of the main directional vector is not constant, the algorithm makes a transition to the end-of-algorithm step 607 in awaiting the next updating of the route traversed by a disturbing mobile obstacle of the network.

If the direction of the main directional vector is constant, the algorithm in a step 604b makes a check to see if the disturbing obstacle, as detected at the step 501, is present on the estimated future directory of the disturbing mobile obstacle considered.

Should the check be negative at the step 604b, the algorithm carries out a step 606 described here below.

Should the check be positive at the step 604b, the algorithm determines a first and possibly a second directional vector of the disturbing mobile obstacle considered, in a step 605.

Thus, should the disturbing mobile obstacle considered move towards an obstacle of the network whose mobility status is "fixed", then the disturbing mobile obstacle will probably bypass the fixed obstacle.

The secondary directional vectors are directional vectors relative to the trajectory of bypass of the fixed obstacle. There are at least two secondary directional vectors if the obstacle can be bypassed by both sides. It is possible for only one secondary directional vector to exist if the obstacle cannot be bypassed from only side. Furthermore, for a same bypass by a given side, it may happen that several trajectories can be envisaged and that several secondary directional vectors may be needed.

Various methods for computing secondary directional vectors may be envisaged. The following method is given by way of an illustrative example whose steps are the following:

determining the first secondary directional vector:
considering the vertex of the overlap polygon in which the fixed obstacle having the highest x-axis value in the shared referential system was detected;
plotting the straight line $\Delta'$ forming an angle of 45° with the direction of the main directional vector of the disturbing mobile obstacle considered, such that this straight line passes through the vertex having the highest x-axis value;

the direction of the first secondary directional vector is given by the previous straight line Δ', and I'$_A$ denotes the point of intersection between Δ and Δ';

determining the second secondary directional vector:

considering the vertex of the overlap polygon of the fixed obstacle having the lowest x-axis value;

plotting the straight line Δ" forming an angle of 45° with the direction of the main directional vector of the disturbing mobile obstacle considered, such that this straight line passes through said vertex having the lowest x-axis value;

the direction of the second secondary directional vector is then given by the previous straight line Δ", and I"$_A$ denotes the point of intersection between Δ and Δ".

Once the main directional vectors and possibly secondary directional vectors have been computed, the algorithm, in a step 606, carries out a weighting relative to the future capacity of the devices of the network to relay or receive data coming from the sender or relay devices of the network. This weighting is a function of the direction of the main directional vector (and, if necessary, the secondary directional vectors) of the disturbing mobile obstacle considered. Indeed, the weighting applied must take account of the estimated future trajectory for the mobile obstacle relative to the position of the device with which the weighting is associated (or relative to communications implicating this device). The weighting is a piece of information representing an estimation of a probability that at least one communication involving said associated device has a level of quality below a pre-determined threshold. It is indeed possible to determine the set of overlapping areas associated with a given communication, a communication being defined, it may be recalled, by the intersection of the overlapping areas of a sender/receiver pair of devices. It is then possible to determine the impact of the trajectory of a mobile object detected with respect to this communication. According to this method, it is then possible to allocate a weighting to a communication call, namely to a pair of devices rather than to a single device. The routing adaptation algorithm activated when the communication is in a critical situation, i.e. threatened by the estimated future trajectory of a detected mobile object, then seeks to determine an alternative path or a complementary path to link up the sender device and the receiver device for example by means of a relay device.

One example of weighting is given here below by way of an illustration in the context of the weighting applied to a given device. Those skilled in the art will know how to adapt an example such as this to a weighting applied to a given communication. We consider the non-oriented angle β formed by the main directional vector of a disturbing mobile obstacle and the straight line linking the current position of the disturbing mobile obstacle (i.e. the barycenter of the current overlapping polygon of the disturbing mobile obstacle) to a device, in this case a receiver device, of the network. Three cases may arise:

if the angle β is smaller than 20° the future capacity of the receiver device concerned to receive radio data is considered to be "low", in other words there is a high risk that the radio links to the device considered will become highly disturbed by the disturbing mobile obstacle;

if the angle β is included between 20° and 50°, the future capacity of the receiver device concerned to receive radio data is considered to be "medium".

if the angle β is greater than 50°, the future capacity of the receiver device concerned to receive radio data is considered to be "high", in other words there is a low risk that the radio links to the device considered will become highly disturbed by the disturbing mobile obstacle.

It is also possible to refine the previous weighting by taking account of the non-oriented angles γ' and γ" respectively formed by the straight line Δ' and the straight line linking the position of the receiver device concerned to I'$_A$ on the one hand and the straight line Δ" and the straight line linking the position of the receiver device considered to I"$_A$ on the other hand.

Here again, three cases may arise:

if the angle γ' (or γ") is smaller than 20°, the future capacity of the receiver device concerned to receive radio data is considered to be "low", in other words there is a high risk that radio links to the device considered will become highly disturbed by the disturbing mobile obstacles;

if the angle γ' (or γ") ranges from 20° to 50°, the future capacity of the receiver device concerned to receive radio data is considered to be "medium".

if the angle γ' (or γ") is greater than 50°, the future capacity of the receiver device concerned to receive radio data is considered to be "high"; in other words there is a low risk that the radio links to the device considered will become highly disturbed by the disturbing mobile obstacle.

Once the weighting step 606 has been performed, the algorithm makes a transition in a step 607 which is an end-of-algorithm step 607 until the next updating of the route traversed by a disturbing mobile obstacle.

Figure 7:
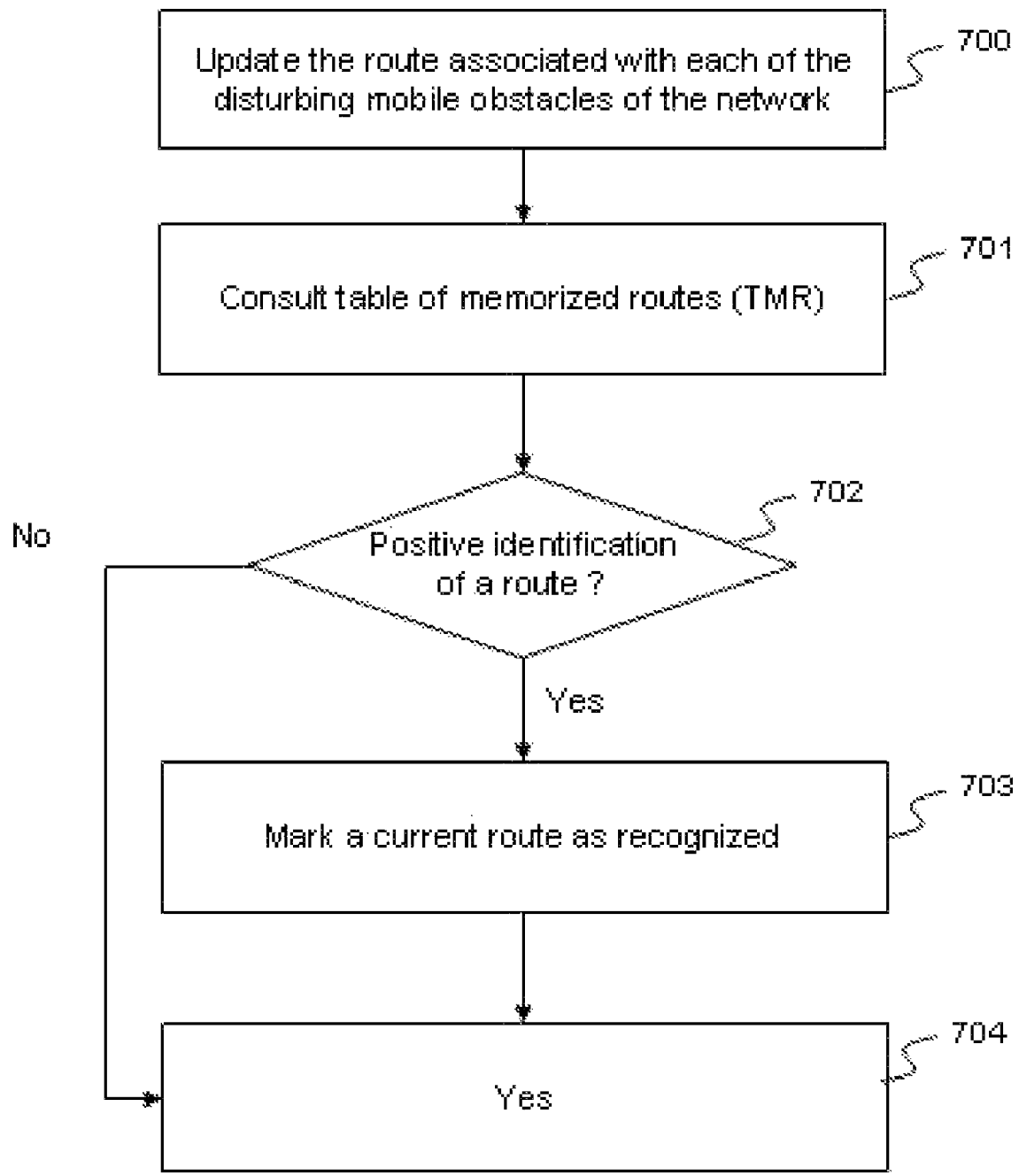
FIG. 7 is a flowchart of an algorithm for the recognition of a current route traversed by a disturbing mobile obstacle according to a particular embodiment of the invention.

FIG. 7 illustrates a flowchart of an algorithm for the recognition of a route traversed by a disturbing mobile obstacle according to a particular embodiment of the invention.

The implementing of such an algorithm makes it possible, by analysis of the route traversed by a disturbing mobile obstacle, to determine whether this obstacle takes a route already used in the past by another mobile obstacle. To this end, a table known as a table of memorized routes of the network (also called a TMR here below) is implemented to memorize all or part of the routes taken by the mobile obstacle, this TMR being updated by a central device implementing the present invention. In other words, this is a chronology of the routes taken by the disturbing mobile obstacles. The conditions of storage of a route in a TMR are referred to here below as non-exhaustive examples:

at the disappearance, out of the coverage area of the network, of a disturbing mobile obstacle, its traversed route is memorized in the TMR;

when the number of positions relative to the route of a disturbing mobile obstacle exceeds a pre-defined minimum value, the route traversed may be memorized in the TMR.

Each data block of the TMR therefore has a corresponding set of data fields defined here below:

a first field representing the memorized route (as described here above with reference to FIG. 5a.

a second field representing the frequency with which the memorized route is taken, i.e. the number of times that the memorized route has been taken by a disturbing mobile obstacle.

In order to prevent over-use of memory resources of the device implementing the present invention, it may prove to be necessary to regularly erase data blocks from the TMR. The conditions of erasure of a route memorized in the TMR are referred to here below by way of non-exhaustive examples:

if the number of data blocks in the TMR reaches a maximum pre-defined value, then the data block having the lowest value of frequency of taking the route is erased;

if at the end of a pre-fixed duration, a counter of the frequency with which a memorized route is taken has not been incremented (for example a period set at 72 hours), the corresponding data block is erased.

Once the route traversed by a disturbing mobile obstacle has been updated 700 (as described further above in the step 503 of FIG. 5*a*), the algorithm in a step 701 consults the table TMP and for each route updated in the figurative local table of obstacles of the network, the algorithm checks to see if a route present in the TMR comprises a sub-route (also called a trajectory segment) identical to the current route (which may be described from the first sample of passed positions obtained at the step 601 or of the second sample of passed positions obtained at the step 602) in a step 702.

If this is the case, the identification of the route is positive and the algorithm makes a transition to the step 703. If not, the identification of the route is negative and the algorithm makes a transition to the end-of-algorithm step 704 until the next updating of the route of a disturbing mobile obstacle.

In the event of a positive identification, in a step 703, the algorithm marks the current route (also called prior trajectory segment) positively identified at the step 702 as being recognized and then makes a transition to the end-of-algorithm step 704 until the next updating of the route traversed by the disturbing mobile obstacle.

Figure 8:
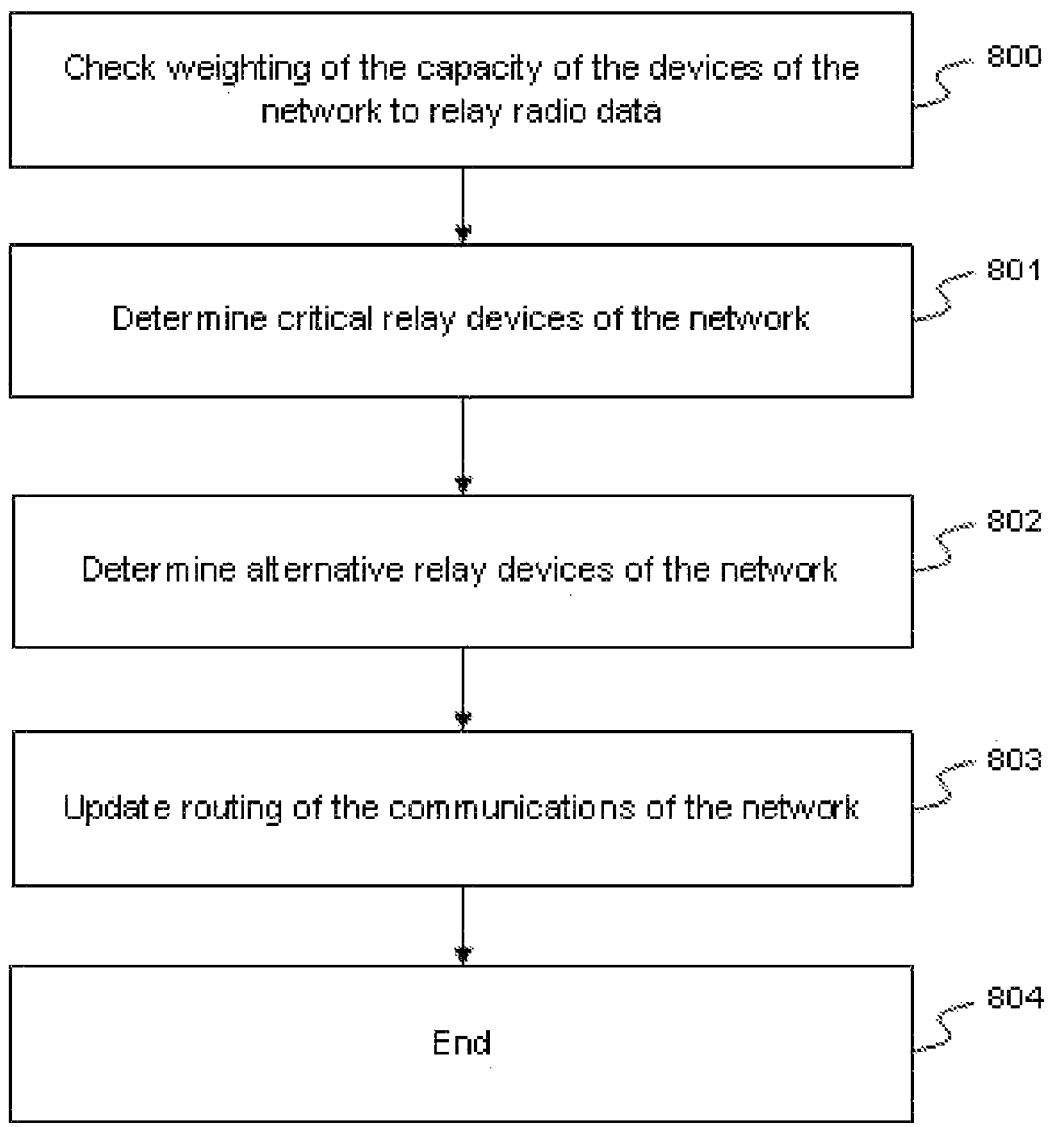
FIG. 8 is a flowchart of an algorithm for predictive routing on estimation of trajectory performed by means of the algorithm of FIG. 6 according to a particular embodiment of the invention.

FIG. 8 is a flowchart of a predictive routing algorithm for the estimation of a trajectory performed by means of the algorithm of FIG. 6 in a particular embodiment of the invention.

The implementing of a routing algorithm of this kind enables an anticipated adaptation of the communications characteristics of the network in terms of routing (radio data transmission paths) and especially a particular use of the relay devices of the network. A routing algorithm of this kind can therefore be used to limit the shadowing phenomena liable to be caused by one or more disturbing mobile objects.

In one particular embodiment of the invention, the routing algorithm can implemented in a central device of the network which is a responsible for setting up connections of the network.

In one variant of an embodiment, the routing algorithm can be implemented distributedly, i.e. it can be implemented in each of the devices of the network whether it is a sender device, a receiver device or a relay device.

The routing algorithm preferably relies on the weighting of the future capacity of the devices of the network to receive radio data (whose principle is described in greater detail with reference to FIG. 6).

However, it is possible to use the algorithm for recognizing the route traversed by a disturbing mobile obstacle (whose principle is described in greater detail further above with reference to FIG. 7) in order to carry out a similar weighting of the receiver devices and/or of the relay devices of the network and exploit the weighting in the context of the present algorithm.

The implementation of the routing algorithm provides for the checking, in a first step 800, of the weightings for the relay devices of the network.

In a second step 801, the present algorithm determines the relay devices considered in a critical situation, i.e. the relay devices whose future capacity to relay radio data is most affected by the movement of a mobile obstacle in the coverage area of the network. Thus, the relay devices of the network having a future data-receiving capacity that is "low" or "medium" are considered to be in a critical situation. It is also possible to make a grading of the level of criticality and consider devices having a future radio-data-receiving capacity that is low as being in a highly critical situation, devices having a medium future radio-data-receiving capacity as being in a medium critical situation and devices having a high future radio-data-receiving capacity as being in a non-critical situation.

In a third step 802, the present algorithm, for each relay device of the network judged to be in a critical situation, determines an alternative relay device having a lower level of criticality.

Thus, in a particular embodiment of the invention, the routing algorithm tries to determine, for each relay device in a critical situation, an alternative relay device in a non-critical situation. If such a relay device proves to be non-existent, the routing algorithm determines an alternative relay device in a medium critical situation. An algorithm for updating the routing of the network is illustrated here below with reference to FIG. 10.

In a fourth step 803, the present algorithm then updates the routing of the network by informing the devices concerned of the replacement of the relay device in a critical situation by the determined alternative relay device in the case of a centralized embodiment or else by modifying the routing tables implemented in the case of a distributed embodiment so as to replace the relay device in a critical situation by the determined alternative relay device.

The present algorithm then makes a transition to the end-of algorithm step 804 until the next updating of the relative weightings pertaining to the future capacity of the network devices for relaying radio data.

Figure 9:
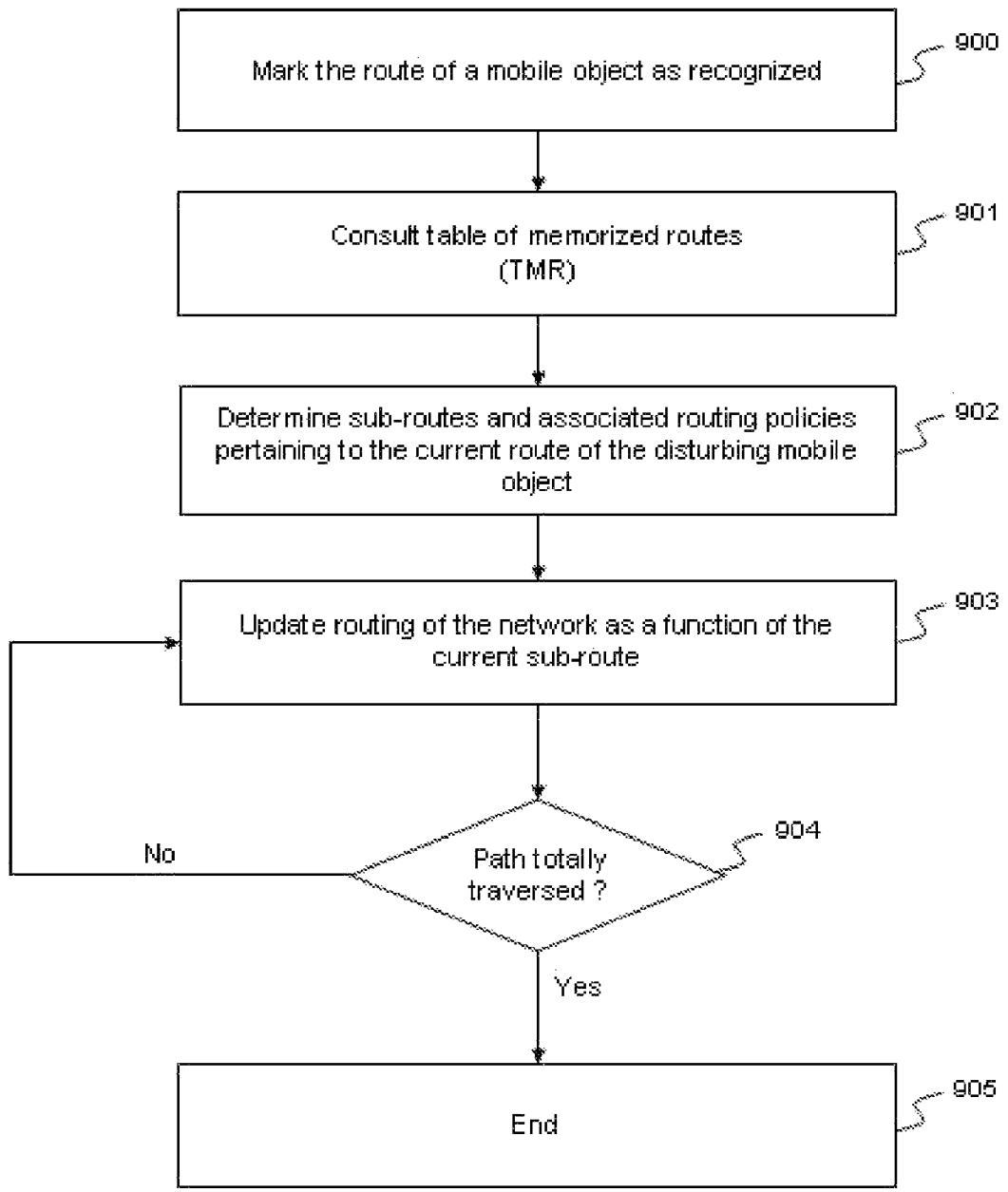
FIG. 9 is a flowchart of an algorithm for predictive routing on recognition of a current route done by means of the algorithm of FIG. 7, according to a particular embodiment of the invention.

FIG. 9 is a flowchart of an algorithm for predictive routing upon recognition of a current route made by means of the algorithm of FIG. 7 according to a particular embodiment of the invention.

The implementation of a routing algorithm of this kind enables anticipated adapting of the network communications characteristics in terms of routing (radio data transmission paths) and especially a particular use of the relay devices of the network. A routing algorithm of this kind thus limits the shadowing phenomena which may be caused by one or more disturbing mobile objects.

It must furthermore be noted that this predictive algorithm for recognition of a current route is an alternative embodiment of the routing algorithm presented here above with reference to FIG. 8.

In a particular embodiment of the invention, the routing algorithm can be implemented in a central device of the network responsible for setting up connections of the network.

In one variant of an embodiment, the routing algorithm can be implemented distributedly, i.e. it can be implemented in each of the network devices whether it is a sender device, a receiver device or a relay device.

The present algorithm preferably relies on the recognition of routes traversed by mobile obstacles.

The initializing of the present algorithm is done in a first step 900 upon recognition of the route traversed by a mobile obstacle according to the principle described with reference to FIG. 7.

In a second step 901, the algorithm consults the table of memorized routes (TMR). As described further above, each data block of the TMR has a corresponding set of data fields defined here below:

a first field representing the memorized route (as described here above with reference to FIG. 5*a*);

a second field representing the frequency with which the memorized route is taken, i.e. the number of times that the memorized route has been taken by a disturbing mobile obstacle.

In the case of the present algorithm, it is necessary to add two additional fields to the two data fields referred to here above:
- a third field representing sub-routes, each route stored in the TMR being capable of being divided into a set of sub-routes, each sub-route being defined by the coordinates of the prior positions of the disturbing mobile obstacle of the corresponding network at its ends;
- a fourth field representing routing policies associated with sub-routes of the network, each sub-route pertaining to a memorized route being associated with a routing policy, in taking account of the disturbances of the communications of the network caused by a disturbing mobile obstacle traversing the corresponding sub-route.

It must be noted that, for a route memorized in the TPM table, the only elements that can be memorized are the associated sub-routes having different routing policies.

In a third step 902, the algorithm thus consults the list of memorized sub-routes and their associated policies pertaining to the route taken by the disturbing mobile obstacle as recognized in the step 900.

In a fourth step 903, the algorithm updates the routing policy of the network as a function of the sub-route traversed by the disturbing mobile obstacle in informing the concerned devices of the new data routing path in the case of a centralized embodiment or else by modifying the routing tables in the case of a distributed embodiment.

In a fifth step 904, the algorithm makes a check to see whether the route of the disturbing mobile obstacle as recognized in the step 900 has been totally traversed. If this is not the case, the algorithm returns to the step 903 and continues to update the routing policy of the network as a function of the sub-route traversed by the disturbing mobile obstacle. If the route of the disturbing mobile obstacle as recognized in the step 900 has been totally traversed, then the algorithm makes a transition to the end-of-algorithm step 905 up to the next recognition of a route traversed by a mobile obstacle.

Figure 10:
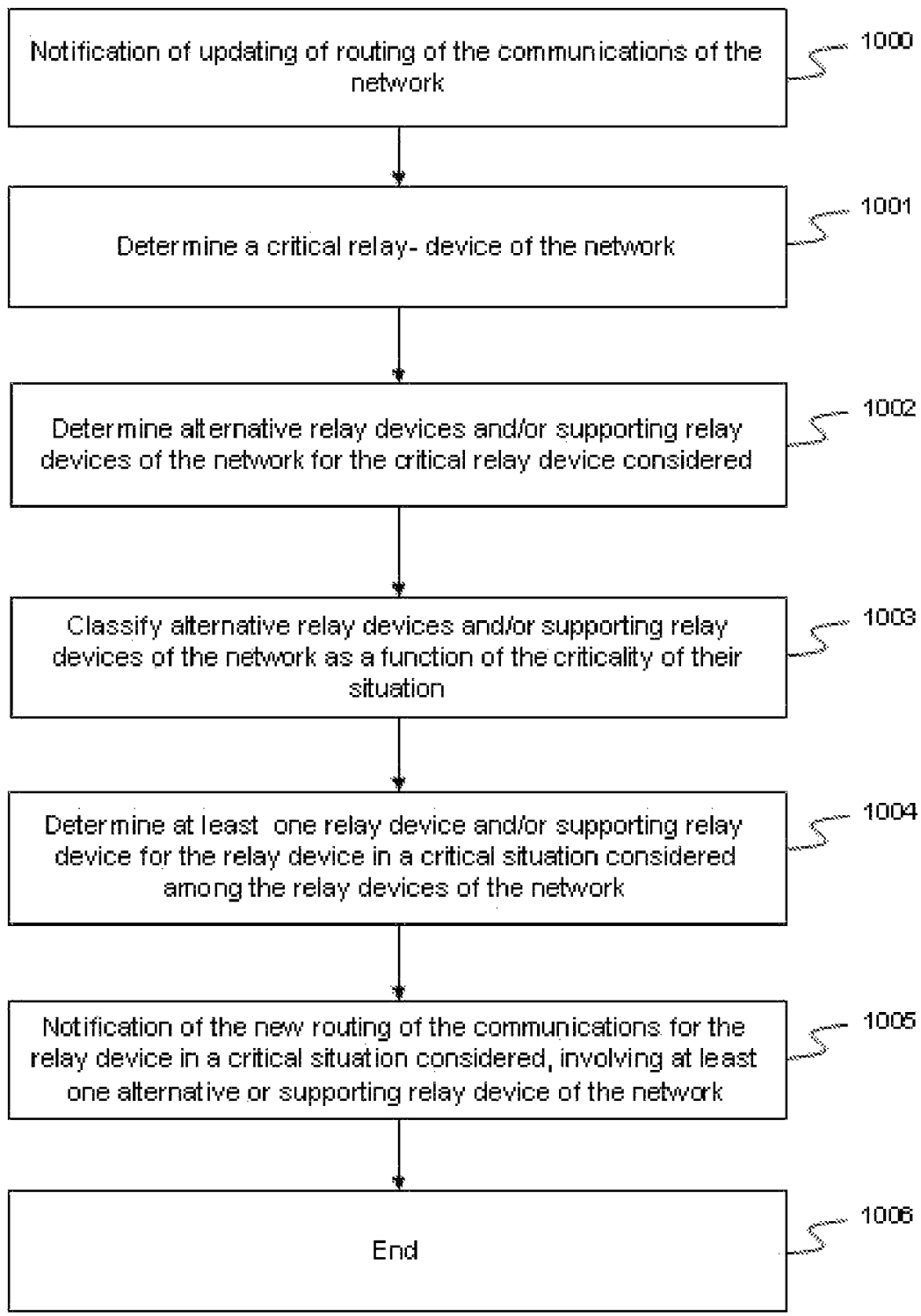
FIG. 10 is a flowchart of an algorithm for updating the routing of the network.

FIG. 10 now presents a flowchart of an algorithm for updating the routing of the network.

Upon notification of the updating of the routing of the network, in a step 1000, which takes place at the implementation of the predictive routing algorithm on estimation of a trajectory in the step 803 of the algorithm of FIG. 8, the central device, in a step 1001, selects a relay device designated as being in a critical situation at the end of the step 801 of the algorithm of FIG. 8.

The algorithm is aimed at reinforcing communications towards a given receiver device:
- if the receiver device (of a data stream considered) is a relay device (for the data stream considered) and in this case the algorithm seeks either to maintain this device as a relay (for the data stream considered) and increase its capacity to receive (data from the data stream considered), or determine a substitution relay to ensure the relay function (for the data stream considered) ensured by the relay device in a critical situation relative to the final destination device (which is the destination of the data stream considered).
- if the receiver device (of the data stream considered) is a final destination device (which is the destination of the data stream considered), then in this case the part of the algorithm aimed at increasing the capacity of a relay device to receive may be transposed by replacing the relay device by the final destination device.

Indeed, in a step 1002, the central device then determines the alternative relay devices of the network capable of supplementing the relay device designated as being in a critical situation (updating method 1). In one alternative embodiment, the central device can also determine the supporting relay devices capable of improving the reception quality of the relay device in a critical situation (updating method 2).

It is important to note that an alternative relay (or a set of relays) is used instead of a relay in a critical situation. The relay device in a critical situation, for which an alternative relay device has been determined, then stops being a relay device (at least for a data stream considered). It also must be noted that a relay device may have to be replaced by a set of several relay devices, known as substitution relays, in order to enable an efficient spatial or even temporal relay in the communications network. These substitution relay devices can then act either as parallel relays, i.e. relays that do not depend on one another, or as consecutive relays, i.e. a given relay relays the data received from another relay in order to supplement the relay function performed hitherto by the relay device in a critical situation.

A supporting relay device for its part will be used to increase the probability that the relay device in a critical situation will receive data that it must relay. The supporting device then complements the routing parts already established in order to increase the redundancy of the data for the data stream considered.

The relay device in a critical situation may be a relay for several data streams, for example several audio channels in the context of the implementation of a "home cinema" type system as shown in FIG. 1. The step 1002 then consists in determining at least one alternative relay device or at least one supporting relay device either for each data stream relayed by the relay device in a critical situation or for all the data streams relayed by the relay device in a critical situation.

The criteria for selecting an alternative relay device are the following:
- an alternative relay device must be capable of communicating with the receiver device to which the radio data relayed by the relay device in a critical situation are addressed, i.e. there is a communications path between the alternative relay device and the receiver device.
- an alternative relay device should be capable of communicating directly or indirectly (through another relay device) with the sender device whose pieces of data are relayed by the relay device in a critical situation, i.e. there is a communications path between the alternating relay device and the sender device.

The criteria for selecting a supporting relay device are the following:
- a supporting relay device should be capable of communicating with the relay device in a critical situation, i.e. there is a communications route between the supporting relay device and the relay device in a critical situation;
- a supporting relay device should be capable of communicating directly or indirectly (through a relay device) with the sender device whose data are relayed by the relay device in a critical situation, i.e. there is a communications path between the supporting relay device and the sender device.

In a step 1003, the different alternating relay devices or supporting relay devices are classified according to the level of criticality of their situation, as defined by means of the trajectory estimating algorithm whose principle is described in detail further above with reference to FIG. 6.

In a step 1004, at least one alternating relay device or at least one supporting relay device is selected according to the classification defined at the previous step 1003.

In the context of a use of the alternating relay devices, one or more alternating relay devices are selected to relay the radio data instead of the relay device in a critical situation selected at the step 1001.

In a use of supporting relay devices, one or more supporting relays are selected in order to increase the number of copies of radio data that the relay device in a critical situation (selected at the step 1001) is capable of receiving.

In a step 1005, the central device that has implemented these steps informs the sender devices and receiver devices considered as well as the alternating relay devices or supporting relay devices about the new routing of the communication or communications of the network depending on whether it is the updating method 1 or the updating method 2 that is implemented.

The algorithm then makes a transition to the step 1006 which is the end-of-algorithm step. The steps 1000 to 1006 may furthermore be reiterated so long as there is at least one existing relay device in a critical situation of the network for which an updating of the routing has not yet been done.

Figure 11:
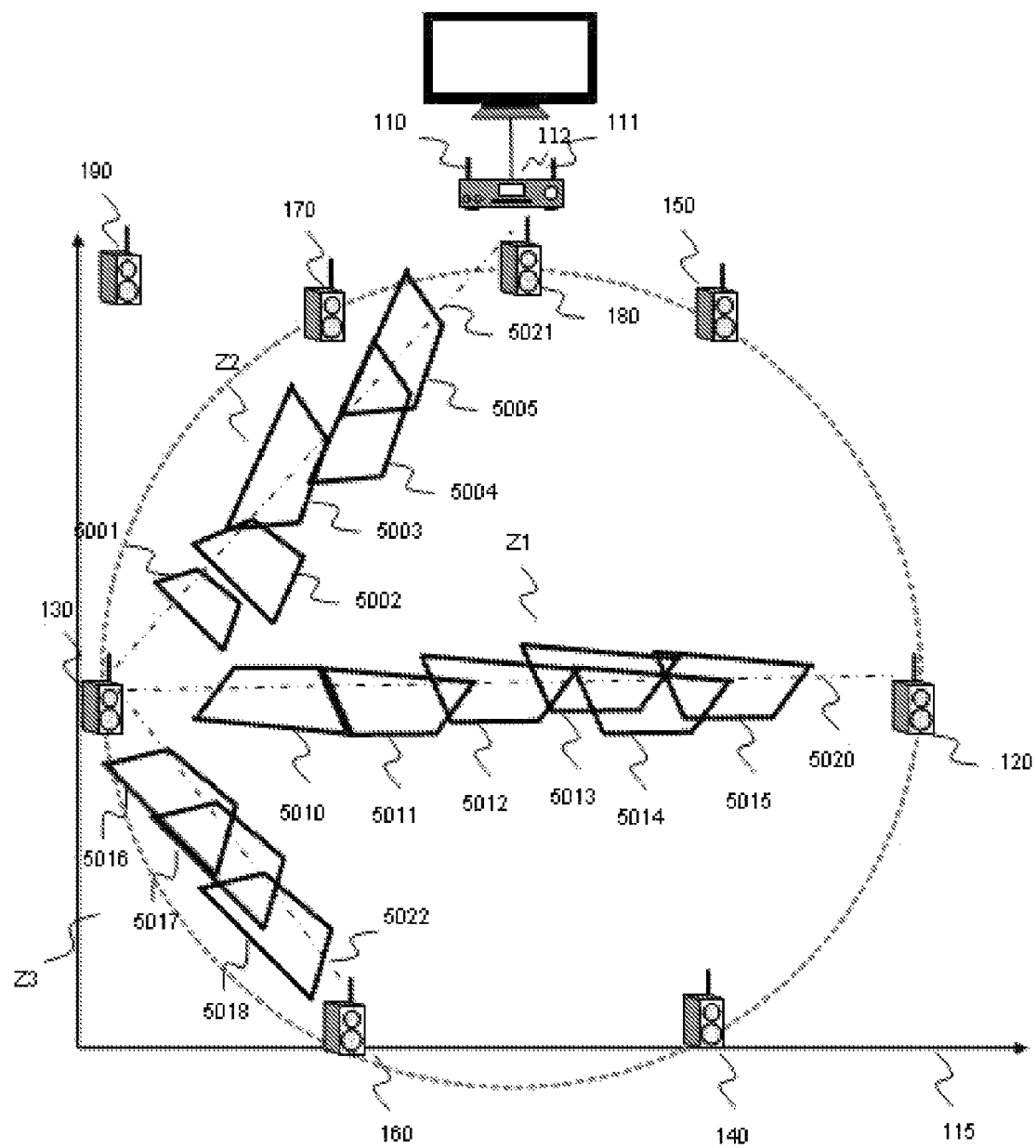
FIG. 11 illustrates a first example of building of critical areas of a receiver device in a wireless communications network according to a particular embodiment of the invention.

Referring now to FIG. 11, we present a first example of the building of critical areas of a receiver device 130 in a wireless communications network 100 according to a particular embodiment of the invention.

In general, a critical area of a receiver device is defined as being a given area among the coverage areas of the communications network, for which the presence of one or more disturbing obstacles may lead to disturbances in one or more communications links (or radio links) necessary to a receiver device. This receiver device may be either the intended recipient (i.e. destination device) of a data content or a relay of a data content on behalf of another destination receiver device of this same data content. A critical area may be defined more precisely as being constituted by at least one overlapping area, i.e. an overlapping area or a union of overlapping areas.

It must be noted that a unique critical area may be associated with a sender device for a set of communications (or even all the communications) involving the receiver device or a critical area may be associated with a receiver device for each communication involving the receiver device. Thus, the adaptation of the routing (as described here below) may take into consideration a set of communications (or even all the communications) involving this receiver device or simply one of the communications involving the receiver device.

This first example illustrates the making of determined critical areas from the union of a set of overlapping areas positioned according to one or more communications links in which the receiver device 130 is involved. More precisely, the devices 120, 130, 140, 150, 160, 180 and 190 have different sender/receiver devices or relays of the communications network 100. The reference 115 represents the referential system used for the presentation.

A critical area Z1 for the device 130 is defined for example by a union of the overlapping areas 5010, 5011, 5012, 5013, 5014 and 5015 which are positioned along the communications link 5020 set up between the receiver device 130 and the sender device 120. The critical area Z1 can be expressed in the same way:

Z1=[5010 U 5011 U 5012 U 5013 U 5014 U5015].

It is important to stress the fact that, here below in the description, a critical area is defined as being linked to a receiver device of the network.

In one example, it is also possible to define a critical area with respect to several communications links for which the receiver device 130 is involved:

an area Z2 with regard to the communications links 5021, namely Z2=[5001 U 5002 U 5003 U 5004 U 5005];

an area Z3 with respect to the communications links 5021, namely Z3=[5016 U 5017 U 5018].

We can then define a critical area Z4 for the receiver device 130, as being the union of the area Z1, Z2 and Z3, namely: Z4=[Z1 U Z2 U Z3].

Figure 12:
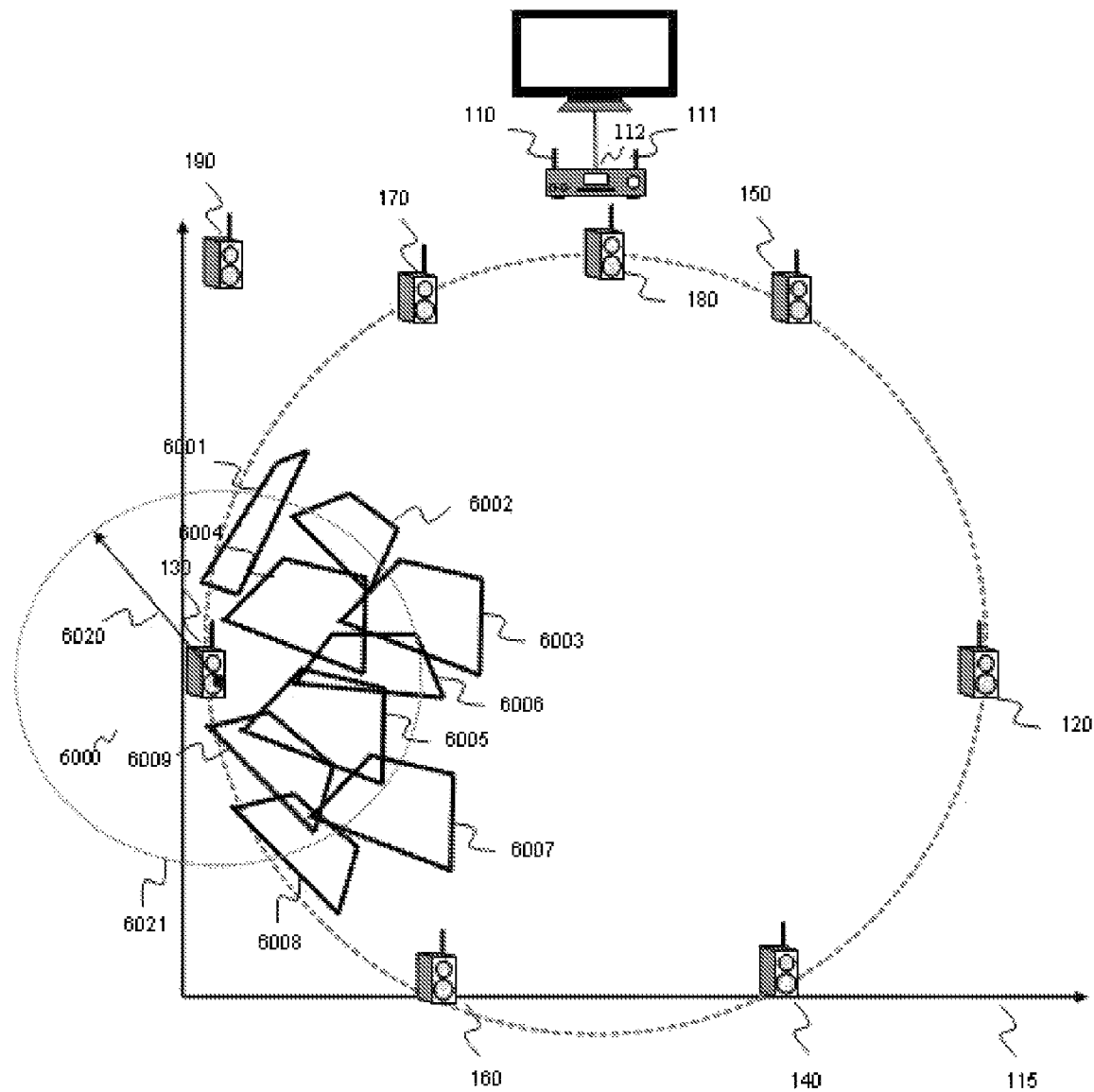
FIG. 12 illustrates a first example of the building of critical areas of a receiver device in a wireless communications network according to a particular embodiment of the invention.

Referring now to FIG. 12, we present a second example of the building of a critical area in a communications network 100 according to a variant of one particular embodiment of the invention.

Indeed, this second example illustrates the making of a critical area built from the union of a set of overlapping areas, at least one part of which is contained in a proximity area of the device. A proximity area of this kind may be defined for example as a function of an intersection between the coverage area of the network and a disk 6000 whose center is a reference point such as the center of the receiver device 130 and a predefined radius 6020 corresponding to a proximity threshold between the receiver device 130 and a disturbing obstacle. The term "proximity threshold" is understood to mean a distance from the receiver device considered, below which the presence of a physical element is likely to generate disturbances that are harmful to communications in progress with the receiver device considered. The order of magnitude of this predefined radius in the context of a domestic network may for example be one meter.

In order to determine the overlapping areas, at least one part of which is recorded in a proximity area of the receiver device 130, all the coordinates of each overlapping area of the network are traversed and then tested to find out whether or not they belong to the proximity disk (in the figure it is actually shown as a sphere). If one of the coordinates of an overlapping area belongs to the proximity disk, this overlapping area is included in the union of the overlapping areas defining the critical area of the receiver device 130.

To determine whether a point of an overlapping area belongs to the proximity disk, it is sought to determine whether the point is located at a distance from the receiver device, smaller than the radius R of the proximity disk. This amounts to applying the following criterion:

$$(x-a)^2+(y-b)^2<R^2$$

with:

(x,y), the coordinates of the point of the overlapping area considered;

(a,b) the coordinates of the center of the proximity disk relative to the receiver device; and R the radius of the proximity disk pertaining to the receiver device.

For this second example, the reference devices 120, 130, 140, 150, 160, 180 and 190 represent the different sender/receiver devices or relay devices of the communications network 100 and the reference 115 represents the reference system used for the representation.

A critical area named Zc for the receiver device 130 is for example determined by a union of the overlapping areas of 6001 to 6009, each of them having at least one of their coordinates included in the disk 6000, with the receiver device 130 as its center and with a predefined radius 6020. This critical area Zc can be expressed as follows:

Zc=[6001 U 6002 U 6003 U 6004 U 6005 U 6006 U 6007 U 6008 U 6009].

Figure 13:
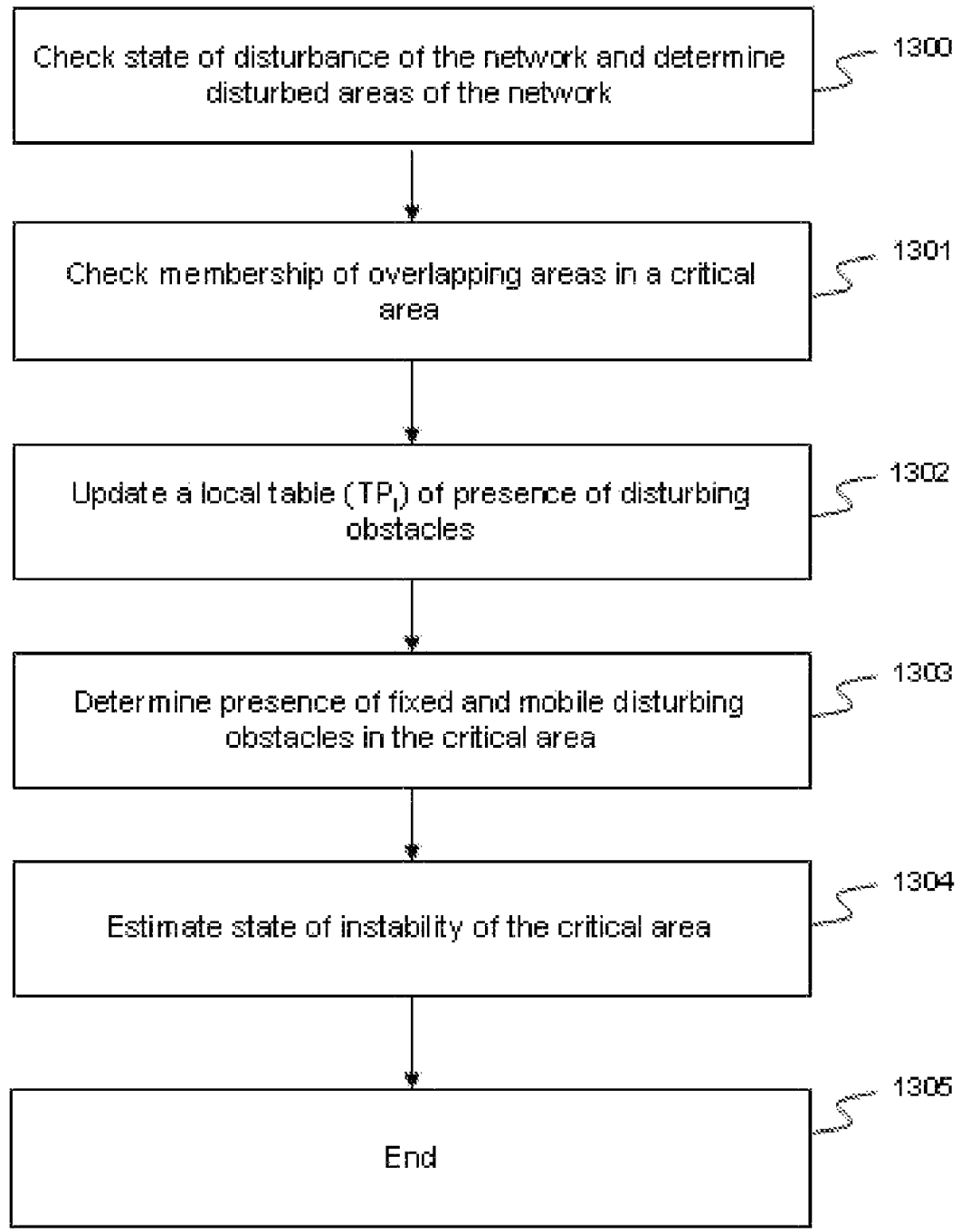
FIG. 13 is a flowchart of an algorithm for the detection of disturbing obstacles in a critical area of the network, according to one particular embodiment of the invention.

FIG. 13 is a flowchart of an algorithm for the detection of disturbing obstacles in a critical area of the network, according to one particular embodiment of the invention. The implementation of such an algorithm is used to determine the presence of obstacles liable to prompt shadowing phenomena between a sender device and one or more receiver devices or relay devices. It can also be used to differentiate those obstacles, among these disturbing obstacles that have been detected as being mobile from those that have been detected as being fixed.

In a first step 1300, a check is made on the state of disturbance of the communications network using a mechanism for detecting current disturbance areas of the network, based on a criterion of quality of communications or of a link (such as the RSSI (Received Signal Strength Identification) level or the binary error rate or bit error rate for example). A method relying on the determining of areas of intersection of coverage and overlapping areas of the network (whose principle has been presented further above with reference to FIGS. 3, 4 and 5*b*) may be implemented in order to prepare a current diagnostic on the state of disturbance of the network.

Once the current state of disturbance of the network has been obtained, a check is made in a second step 1301 on the membership of the overlapping areas determined in the step 1300 in a critical area of a receiver device. In other words, a check to see if one of the disturbing obstacles (liable to be located in the overlapping areas determined at the step 1300) is located in the critical area.

In one particular embodiment of the invention, the step of verifying the state of disturbance of the network is done periodically.

In a third step 1302, an updating is done of a local table, known as a local table TP, representing the presence or absence (i.e. non-presence) of disturbing obstacles in the coverage area of the network for each of the overlapping areas of the critical area. This local table TP is updated periodically by the present algorithm and indexed as a function of the time at which it is updated, this time or instant being known as "i". Each data block of the local table TP corresponds to an overlapping area and constitutes a piece of information on presence or absence of an obstacle for each overlapping area of the critical area considered.

The local table is thus denoted as TPi to represent the local table of presence of obstacles in the critical area at an instant i.

A local reference table TP0 is also built. This local table has a format identical to that of the local table TPi but one that corresponds to a local table with a total absence of obstacles in the critical area considered. By default, the data contained in this local table corresponds to the data contained in a local table TPi for which there would be no detection whatsoever for each of these overlapping areas of the critical area.

In a fourth step 1303, by comparison between the local tables TPi and TP0, the presence of disturbing obstacles in the critical area as well as their fixed or mobile character is determined.

If the local table TP(i−1), i.e. the local table indexed "i−1" is identical to the local table TPi, no mobile obstacle is deemed to be present. If not, it is deemed that there is at least one disturbing obstacle present In a fifth step 1304, an estimation of the state of instability (or level of instability) of the critical area is made so as to characterize the fact that:
  there is no disturbing obstacle in the critical area;
  there is at least one disturbing fixed obstacle present in the critical area;
  there is at least one disturbing mobile obstacle present in the critical area.

The level of instability of the critical area thus represents a development of disturbances detected in the critical area, the mobile or fixed character of a disturbing obstacle being determined as a function of variations of disturbances in the critical area. Indeed, an obstacle is considered to be fixed when the disturbances present in the overlapping area or areas in which the obstacle has been detected are, in a pre-determined period, included in a given interval, i.e. that they undergo variations about a nominal value that are negligible relative to this nominal value. Any other obstacle detected in this overlapping area or overlapping areas is then mobile.

Once the step 1304 has been completed, a transition is made to a sixth step 1305 for ending the disturbing obstacle detection algorithm.

Figure 14:
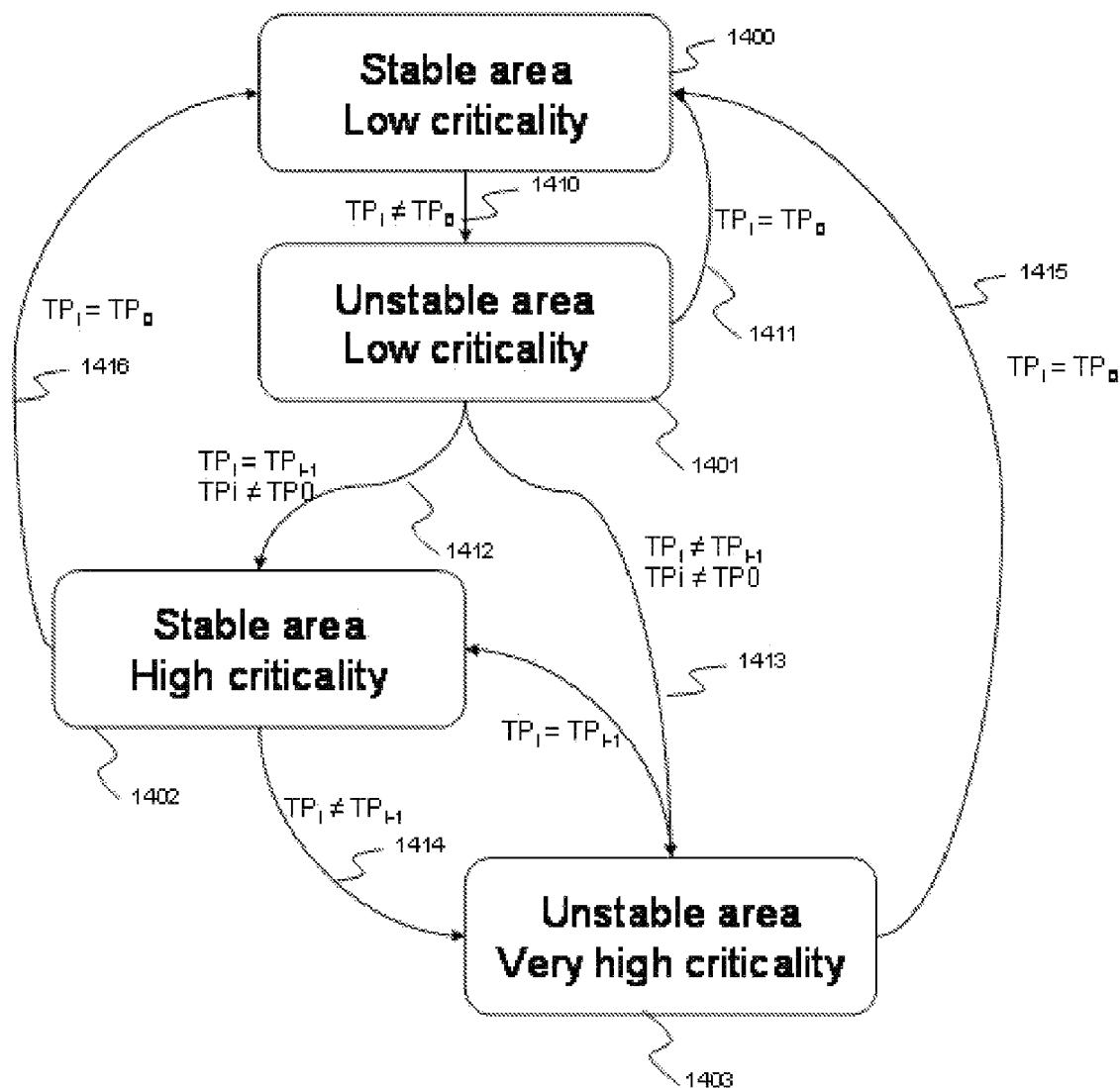
FIG. 14 illustrates a graph of events representing an algorithm for determining a level of instability and level of criticality for a critical area considered.

FIG. 14 illustrates a graph of events representing an algorithm for determining a level of instability and a level of criticality for a critical area considered.

The implementing of such an algorithm enables a device of the network to estimate the impact of the disturbances caused by one or more obstacles present in the critical area as a function of the fixed or mobile character of the obstacle. It must be noted that a disturbing mobile obstacle is deemed to be critical for a communications network owing to the dynamic nature of the disturbance that it causes.

By default, when there is no obstacle in the critical area (state 1400), the critical area is deemed to be in a stable state. This corresponds to an absence of a detection of disturbing obstacles in this critical area. The estimated level of criticality is therefore low. At the first detection of a new disturbing obstacle in the critical area (state 1410), the critical area is deemed to be in an unstable state (state 1401). This corresponds to a detection of at least one mobile obstacle and the level of criticality is kept at a low level. This state 1401 is used to filter the disturbing mobile obstacles on the boundary of the critical area and/or obstacles that make only localized one-time appearances within the critical area. Thus, an untimely reconfiguration of the routing of the network is prevented.

Here below, depending on the fixed or mobile character of the disturbing obstacles within the critical area, the level of instability and the level of criticality of the critical area can be the following:
  if at least one disturbing fixed obstacle is detected in the critical area, the state of instability of the area is considered to be stable and the criticality high (state 1402);
  if at least one disturbing mobile obstacle is detected in the critical area, the state of instability of the area is considered to be unstable and the criticality very high (state 1403);
  if no disturbing obstacle is detected, the state of instability of the area is considered to be stable and the criticality low (state 1400).

By comparison (references 1410, 1411, 1412, 1413, 1414 and 1415) of the current local table TPi with the preceding local table TPi and the local table TP0, we are therefore in a position to determine the level of instability and the level of criticality of the critical area.

Figure 15:
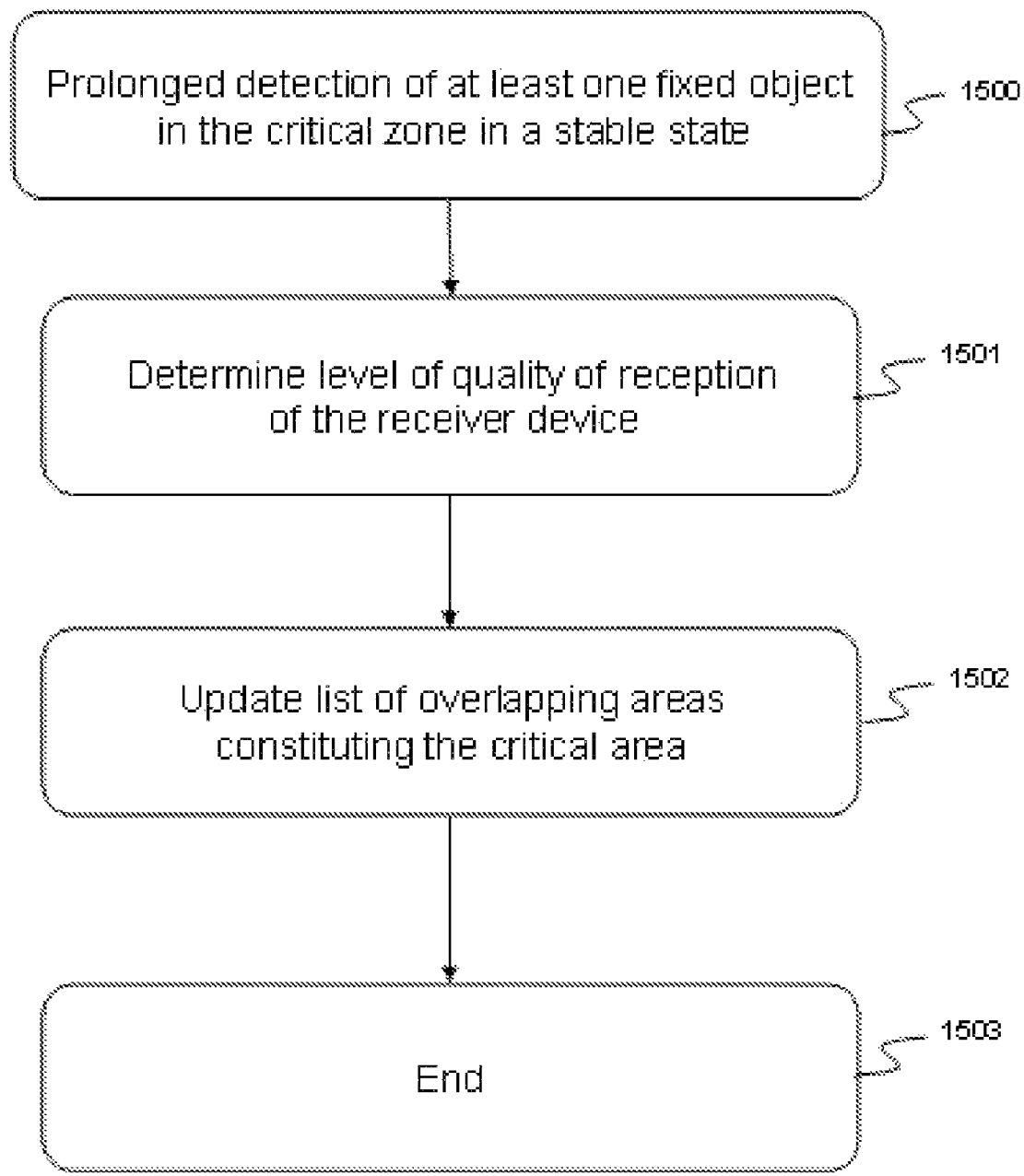
FIG. 15 is a flowchart of an algorithm for excluding overlapping areas from a list of overlapping areas constituting a critical area according to one particular embodiment of the invention.

Referring now to FIG. 15, we present a flowchart of an algorithm for excluding overlapping areas from a list of overlapping areas constituting a critical area according to one particular embodiment of the invention. The implementation of such an algorithm dynamically refines the constitution of critical areas for each of which the construction has not been optimal.

This algorithm is implemented more particularly when, at a step 1500, an disturbing obstacle (especially a fixed one) is detected as being present in a critical area considered to be stable for a pre-determined period of time (for example a period of several minutes. After the effective level of reception quality for the communication or communications concerned despite the presence of the obstacle in the critical area, has been determined (for example by measurement) during a step 1501, it is detected that the receiver device associated with the critical area is nevertheless capable of communicating acceptably.

It may be recalled that this situation may be due to the fact that the constitution of the critical area is simply not optimal or else that a change in routing of the communications has just been done or else that the critical area is determined so as to prevent communications difficulties (i.e. the critical area has a part available which is not on the path of the communication with which the critical area is associated, serves to prevent the intrusion of an obstacle on the edges of the communication considered, and has the detected disturbing fixed obstacle located with it).

As a non-exhaustive example, whether a communication can be considered to be acceptable can be judged by measuring the power of the radio signal received (for example an RSSI measurement) or by measuring the bit error rate pertaining to the data stream of the radio signal received. Should the result of the measurement be greater than a minimum threshold representing quality sufficient for reception of a radio signal, the communications quality is qualified as being sufficient. Whether a communication can be considered to be acceptable can also be judged according to a rate of data loss at reception, the receiver device having preliminarily obtained a piece of information indicating the number of copies of a same piece of data (this principle of data redundancy is explained here below) which it is supposed to receive. Whether a communication can be considered to be acceptable can also be judged as a function of the capacity of the receiver device to correct the errors in the data received, through the use for example of a Reed-Solomon type decoder.

In this example, the particular position of the fixed obstacle in the critical area may be deemed to be not disturbing for the associated receiver device. Thus, data blocks of the local table TPi corresponding to the overlapping areas for which a presence of a fixed obstacle is detected, but for which the receiver device can communicate acceptably, are then eliminated during the step 1502.

A transition to an end-of-algorithm step 1503 is done when the updating of the local table TPi is terminated.

Figure 16:
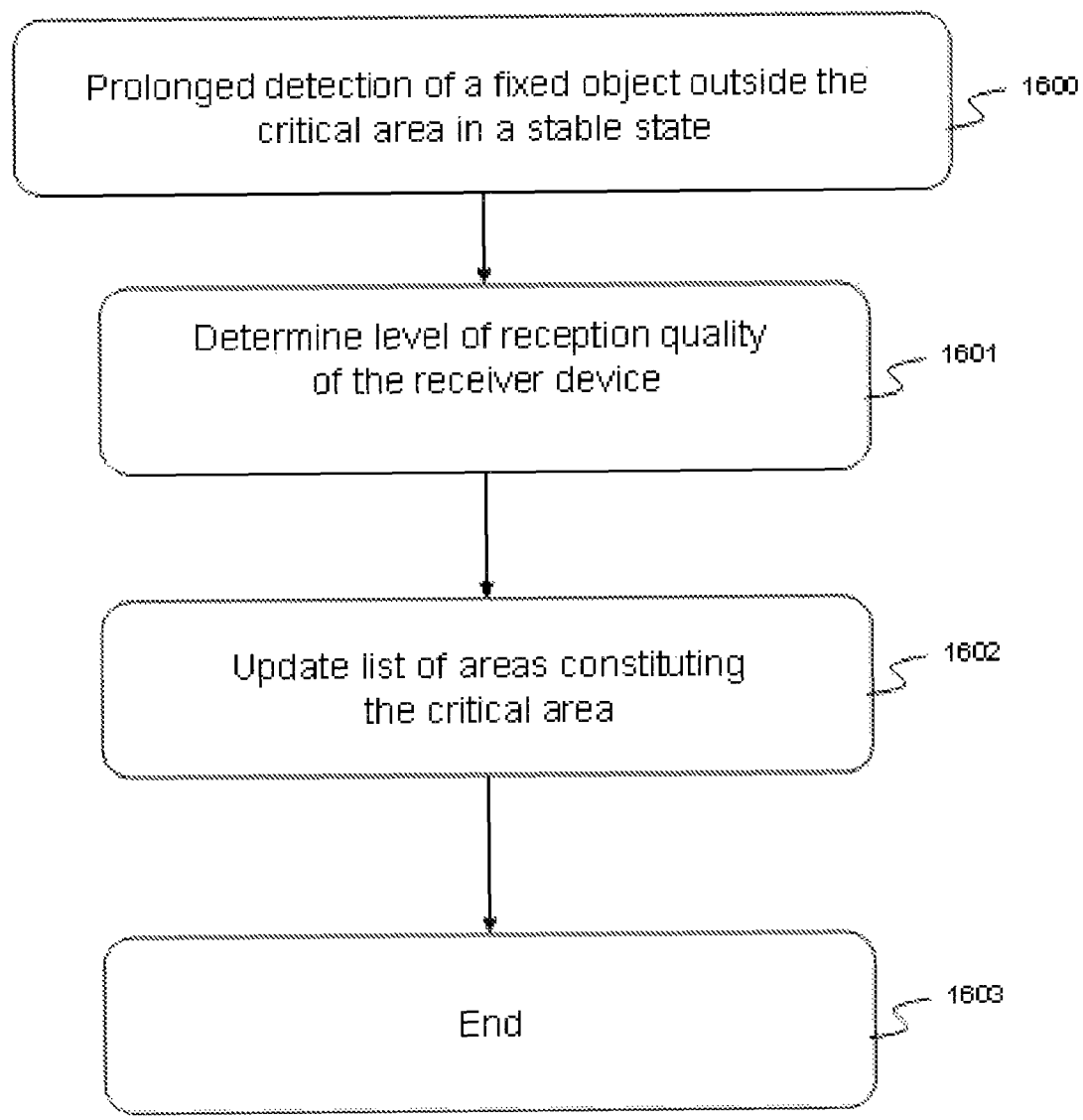
FIG. 16 is a flowchart of an algorithm for including overlapping areas in a list of overlapping areas constituting a critical area, according to one particular embodiment of the invention.

Referring now to FIG. 16, we present a flowchart of an algorithm for including overlapping areas in a list of overlapping areas constituting a critical area, according to one particular embodiment of the invention.

The implementation of such an algorithm enables the dynamic refining of the constitution of critical areas for which the building is not optimum.

This algorithm is more particularly implemented when, at a step 1600, a disturbing obstacle (especially a fixed obstacle) is detected as being present in the coverage area of the network and outside a critical area considered to be stable as of a prolonged duration (for example of several minutes). After the level of reception quality has been determined in a step 1601 (identical to the step 1501), despite the absence of the disturbing obstacle from the critical area, the receiver device is not able to communicate acceptably.

In this example, the particular position of the fixed obstacle may be considered, outside the critical area, to be disturbing. The local table TPi is then completed in a step 1602 by the addition of the overlapping area for which the presence of the fixed obstacle has been detected.

A transition to an end-of-algorithm step 1603 is done when the updating of the local table TPi is terminated.

In the present invention, the capacity of a receiver device to receive, as a function of the characteristics of a critical area (level of instability and level of criticality) associated with it, may be determined as a function of rules set forth here below.

This makes it possible for example to estimate the need, for the receiver device considered, to receive additional copies of a same piece of data in order to ensure at least good reception of the data. Indeed, by increasing the number of copies of a same piece of data broadcast in the communications network, the probability that the receiver device will receive this data as well as the capacity of the receiver device to correct the areas contained in the copy or copies received (by applying a Reed-Solomon type error correction mechanism for example) will be improved. Furthermore, this makes it possible for example to assess the need for replacing the receiver device considered by the alternative relaying device in the routing of data in the communications network, when this receiver device is acting as a relay device on behalf of another destination device for a data stream.

In the particular embodiment discussed further above with reference to FIG. 12, a critical area is first of all determined for the receiver device 130. The level of instability and the level of criticality associated with this critical area will then be estimated for the critical area of the receiver device 130. These two levels are used to determine a probability for which the receiver device (which may be a relay device for a given data stream) can communicate with one or more sender devices which may also be one or more of the relay devices for the given data stream), in other words to determine the capacity of the receiver device to receive radio data. Several cases may arise here:

if the critical area is considered to be stable and of low criticality, the capacity of the receiver device to receive radio data is high;

if the critical area is considered to be stable and of high criticality, the capacity of the receiver device to receive radio data is low;

if the critical area is considered to be unstable and of low criticality, the capacity of the receiver device to receive data is low;

if the critical area is considered to be unstable and of high criticality, the capacity of the receiver device to receive radio data is very low.

For example, this indicator is used to define the redundancy of the radio data needed to ensure transmission to the receiver device so that it can maintain acceptable reception quality. Thus, it is possible to define a number of copies of radio data elements to be addressed (for example through relay devices) to the receiver device 130 as a function of the level of instability and of the level of criticality determined for the critical area associated with the receiver device 130:

if the critical area is considered to be stable and of low criticality, the routing of the data in the network takes account of the transmission of a copy of the data if the critical area is considered to be stable and of high criticality, the routing of the data in the network takes account of the transmission of at least two copies of the data of the stream considered addressed to the receiver device 130;

if the critical area is considered to be unstable and of low criticality, the routing of the data in the network takes account of the transmission of at least two copies of the data of the stream considered intended for the receiver device 130;

if the critical area is considered to be unstable and of high criticality, the routing of the data in the network takes account of the transmission of multiple (for example more than three) copies of the data of the stream considered intended for the receiver device 130.

Furthermore, the role of a receiver device 130 for a data stream considered can be taken into account. For example if a critical area is considered to be unstable and of high criticality and if the critical area is considered to be stable and of high criticality and if the device 130 is a relay device on behalf of another final destination device of the data stream considered, then the routing of the data in the communications network can substitute an alternating relay device for the receiver device 130, this alternative relay device having for example an associated critical area (at least as regards the data stream considered) that is stable and of low criticality.

More generally, this indicator is used to adapt the routing of the communications intended for the receiver device 130 considered when this receiver device 130, following the data stream considered, has the role of final destination of the data stream considered or that of a relay device on behalf of another final destination of the data stream considered.

Figure 17:
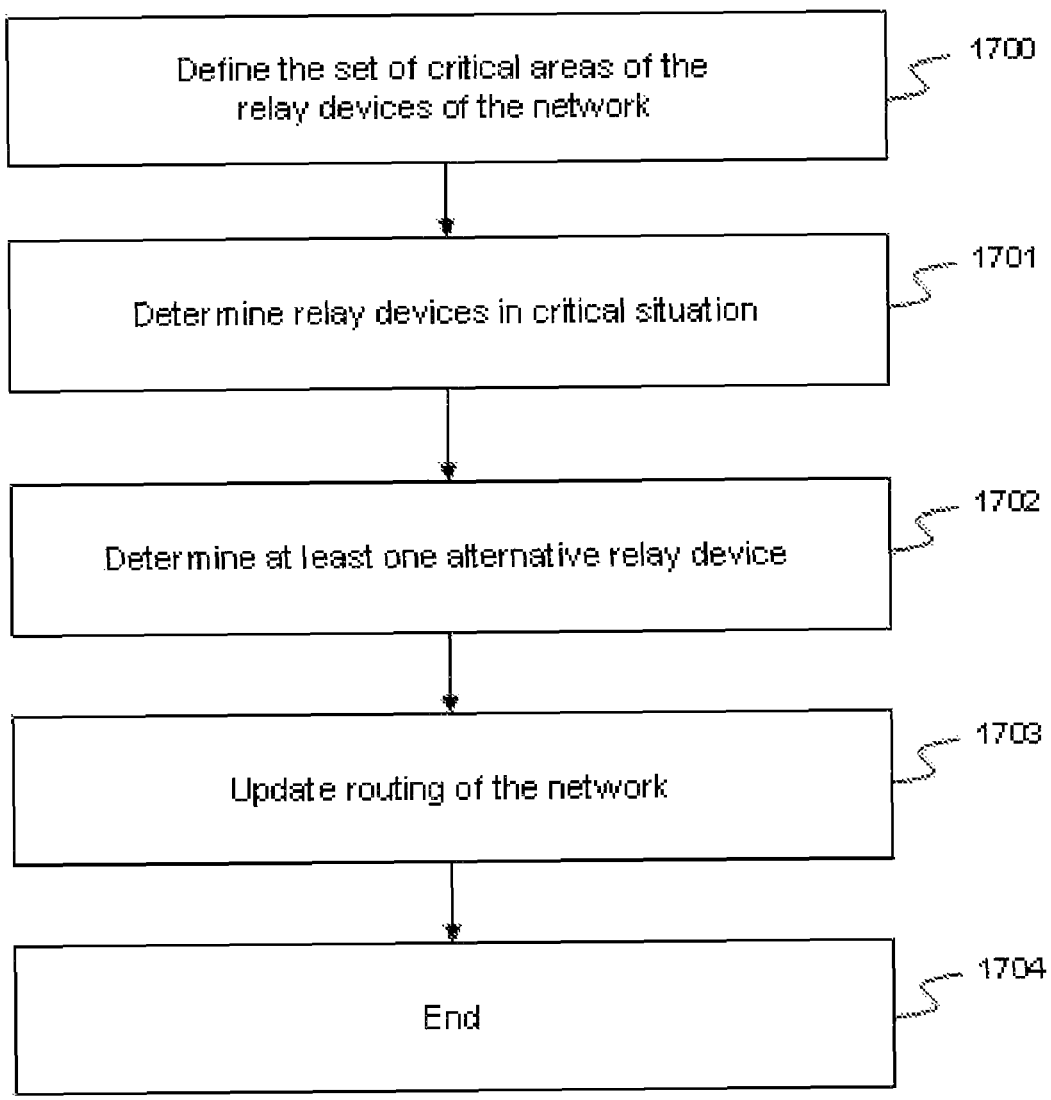
FIG. 17 is a flowchart of an algorithm for routing communications by selection of an alternative relay device according to a particular embodiment of the invention.

FIG. 17 illustrates a flowchart of an algorithm for routing communications by selection of an alternative relay device according to a particular embodiment of the invention.

The implementation of such an algorithm is used to adapt the characteristics of communication of the network in terms of routing and especially the use of the relay devices of the network so as to prevent the effects of disturbance likely to be caused by one or more obstacles present in the coverage area of the network.

In a first step 1700, the set of critical areas of the different receiver devices of the network are defined according to the principle described here above with reference to FIG. 12 for example.

In a second step 1701, the relay devices in a critical situation of the network are determined: these are the relay devices whose capacity to relay is liable to be disturbed by the presence of disturbing obstacles in the associated critical area.

Thus, the devices considered to be in a critical situation are the receiver devices (or relay devices) having a "low" or "very low" capacity to receive. It is also possible to carry out a grading of the capacity to receive of a device by means of instability levels and criticality levels of the critical area associated with it (the principle of which is described in detail further above, with reference to FIG. 14). Indeed, it is possible to consider a receiver device having an associated unstable critical area with a high level of criticality as a device that is in a "highly" critical situation, a receiver device having an associated stable critical area with a high level of criticality as a device in a "medium" critical situation and a receiver device having an associated stable critical area with a low level of criticality as a device in a "non-critical" situation.

A step 1702 is used to determine at least one relay device, called an alternative relay device, out of all the available relay devices of the network, having an associated critical area that is stable and has a low level of criticality, thus fulfilling the relay function between the sender device and the final destination device instead of the relay device considered.

Thus, in one particular embodiment of the invention, the relay device selected that is capable of acting as a relay between the sender device and the final destination device instead of the relay device considered is the one with the most stable critical area and the lowest level of criticality.

In a step 1703, the routing of the network is then updated through notification to the receiver devices concerned of a piece of information on routing, comprising for example an identification of the alternative relay device or devices selected.

Then, a transition is made to an end-of-algorithm step 1704, this end step being maintained up to the next updating of the routing of the network.

Figure 18:
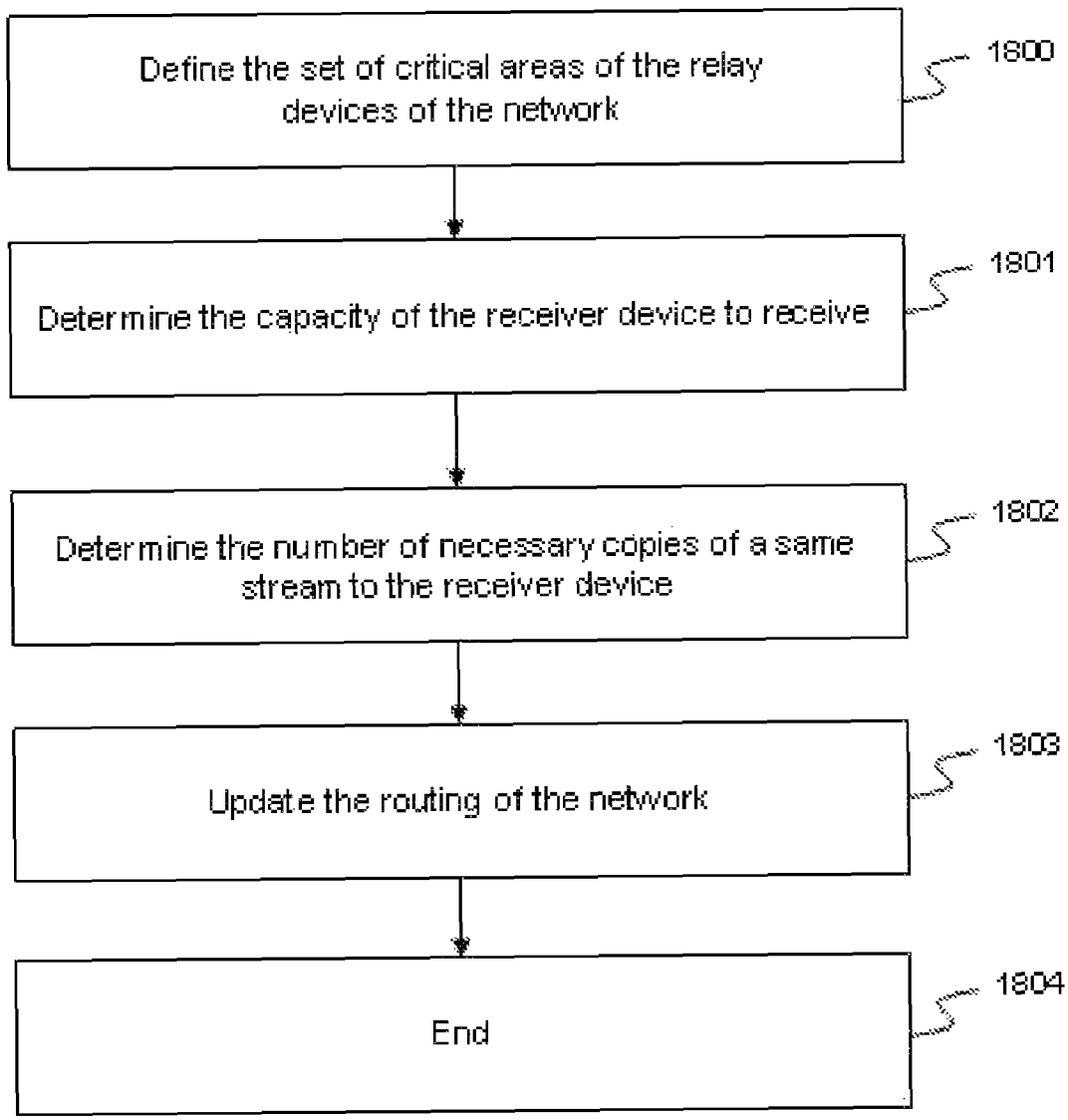
FIG. 18 is a flowchart of an algorithm for routing communications by determining a number of transmissions needed for a receiver device according to one variant of a particular embodiment.

FIG. 18 is a flowchart of an algorithm for routing communications by determining a number of transmissions needed for a receiver device according to one variant of a particular embodiment.

The implementation of such an algorithm is used to adapt the characteristics of network communications in terms of routing and especially the use of the number of re-transmissions of the sender devices of the network so as to prevent effects of disturbances that could be caused by one or more disturbing obstacles present in the network.

A first step 1800 is used to define the set of critical areas of the different receiver devices of the network according to the principle described here above with reference to FIG. 12 for example.

A second step 1801 is then used to determine the stability and the criticality of each critical area according to the principle described further above with reference to FIG. 14.

A third step 1802 is used to determine the number of re-transmissions needed, i.e. the number of copies of same data elements that seem to be necessary to ensure at least correct reception by the receiver device of the radio data, depending on the level of instability and the level of criticality of the critical area.

In a fourth step 1803, the routing of the network is then updated through notification for example to the receiver devices concerned of an identification of the relay device or devices selected to relay the copies.

Then, a transition is made to an end-of-algorithm step 1804, this end step being maintained until the next updating of the routing of the network.

The algorithm illustrated in FIG. 19 relates to the algorithm for updating the routing of the network according to a particular embodiment compliant with the invention.

Upon notification of the updating of routing of the network, in a first step 1900 that occurs after the implementation of the routing algorithms described here above with reference to FIGS. 10, 17 and 18, a transmission is made to the set of devices of the network, in a second step 1901, of a first piece of information representing the new routing configuration of the network and a second piece of information representing the instant for which a switching must be made from the current configuration to a new configuration. For example, the network cycles are numbered and the master device provides an indication of the number of cycles in progress during the transmission of its own data frame. The second piece of information, representing the instant for which a switching of the current configuration must be implemented, can then be the network cycle number for which the new configuration is effective. The switching instant should be greater than the maximum latency of the network so as to ensure that all the devices of the network, directly or by relay mechanism, have effectively received the indication of switching. This taking into account of the switching instant can if necessary be confirmed by an acknowledgement mechanism.

A third step 1902 is then used to wait for a time slot or time period (until the switching instant) for which the reception by all the devices of the network of the first and second piece of information must be guaranteed.

In a fourth step 1903, the switching is performed, for all the devices, to the new routing configuration of the network.

Then a transmission is made to an end-of-algorithm step 1904.

The methods of adapting the routing describes hereinabove can be used either alone or in combination. Indeed, the routing of communications in the network may be adapted by determining at least one future trajectory of a disturbing mobile obstacle. The routing of communications in the network may be further adapted by considering, in addition to at least one future trajectory of a disturbing mobile obstacle, variations of quality of communications traversing at least one critical area, for which the building has been described above in relation to FIGS. 11 and 12.

The invention claimed is:

1. Method for managing communications in a wireless communications network comprising a set of device pairs constituted by a sender device and a receiver device, each of the devices having a determined area of communications coverage, the coverage areas of each device pair having a mutual intersection area between a sending coverage area and a receiving coverage area,
wherein said method comprises steps of:
determining at least one future trajectory of a disturbing mobile obstacle as a function of a set of prior positions of said disturbing mobile obstacle, a position of an obstacle being determined as a function of areas of mutual overlapping of at least two disturbed intersecting areas, a disturbed intersecting area having a given state of disturbance according to a determined criterion of quality of communications between the devices of the device pairs corresponding to said disturbed intersection area; and
establishing a forecast diagnostic of quality of communications in the network by examining the determined future trajectory or trajectories.

2. Method for managing communications according to claim 1, wherein said step of determining at least one future trajectory comprises a step of determining at least one segment of a future trajectory of the disturbing mobile obstacle by extrapolation of a segment of a prior trajectory of said disturbing mobile obstacle, and wherein said step of establishing a forecast diagnostic is performed from said determined segment or segments of a future trajectory.

3. Method for managing communications according to claim 1, wherein said step of determining at least one future trajectory comprises a step of determining at least one segment of a future trajectory of the disturbing mobile obstacle by recognition of a segment of a prior trajectory with which said segment or segments of a future trajectory are associated in a predetermined way, and wherein said step of establishing a forecast diagnostic is performed from said determined segment or segments of a future trajectory.

4. Method for managing communications according to claim 1, further comprising successive preliminary steps of determining areas of mutual overlapping of at least two disturbed intersecting areas, wherein the disturbing mobile obstacle is detected from said determined mutual overlapping areas.

5. Method for managing communications according to claim 4, further comprising a step of detecting a fixed obstacle at a given position from said determined mutual overlapping areas, wherein said at least one future trajectory of the disturbing mobile obstacle is determined as a function of the given position of the detected fixed obstacle and of at least one sub-set of the mutual overlapping areas that have used to detect the disturbing mobile obstacle.

6. Method for managing communications according to claim 5, wherein, at least one segment of a future trajectory of the disturbing mobile obstacle being determined from a segment of a prior trajectory of said disturbing mobile obstacle, said at least one future trajectory of the disturbing mobile obstacle is determined as a function of at least one segment of a secondary trajectory bypassing the given position of the fixed obstacle detected, each segment of a secondary trajectory forming a predetermined angle with said segment of a future trajectory of the disturbing mobile obstacle.

7. Method for managing communications according to claim 1, further comprising a step of modifying the routing of at least one communication as a function of said at least one diagnostic made at said step of establishing a forecast diagnostic.

8. Method for managing communications according to claim 7, wherein the communication(s) whose routing is modified are selected as a function of a weight associated with devices among said sender and/or receiver devices of the network, said weight being determined as a function of an estimation of a probability that at least one communication involving said associated device has a level of quality below a predetermined threshold.

9. Method for managing communications according to claim 7, wherein the step of modifying the routing of at least one communication includes a step selected from the group consisting of:
a step of reinforcing, for a device receiving a data stream, the communications of this data stream intended for the receiver device; and
a step of determining, for a device relaying a data stream intended for a receiver device, an alternative device for relaying said data stream intended for said receiver device.

10. Method for managing communications according to claim 1, wherein a critical area within the network, for which the presence of at least one obstacle is liable to be disturbing for at least one communication involving a receiver device, is determined by a union of areas of mutual overlapping of at least two disturbed intersecting areas; and wherein said method further comprises the following steps of:
estimating a level of capacity of the receiver device to receive, by analysis of variations of quality of communications traversing said critical area; and
adapting the routing of communications of the network to the estimated level of capacity to receive.

11. Computer-readable storage means storing a set of instructions that may be run by a computer in order to implement a method for managing communications in a wireless communications network comprising a set of device pairs constituted by a sender device and a receiver device, each of the devices having a determined area of communications coverage, the coverage areas of each device pair having a mutual intersection area between a sending coverage area and a receiving coverage area,
wherein the following steps are performed when said set of instructions is executed:
determining at least one future trajectory of a disturbing mobile obstacle as a function of a set of prior positions of said disturbing mobile obstacle, a position of an obstacle being determined as a function of areas of mutual overlapping of at least two disturbed intersecting areas, a disturbed intersecting area having a given state of disturbance according to a determined criterion of quality of communications between the devices of the device pairs corresponding to said disturbed intersection area; and
establishing a forecast diagnostic of quality of future communications in the network by examining the determined future trajectory or trajectories.

12. Device for managing communications in a wireless communications network comprising a set of pairs constituted by a sender device and a receiver device, each of the devices having a determined area of communications coverage, the coverage areas of each device pair having a mutual intersection area between a sending coverage area and a receiving coverage area, wherein said managing device comprises:

first means for determining at least one future trajectory of a disturbing mobile obstacle as a function of a set of prior positions of said at least one disturbing mobile obstacle, a position of an obstacle being determined as a function of areas of mutual overlapping of at least two disturbed intersecting areas, a disturbed intersecting area having a given state of disturbance according to a determined criterion of quality of communications between the devices of the device pairs corresponding to said disturbed intersection area; and means for establishing a forecast diagnostic of quality of communications in the network by examining the determined future trajectory or trajectories.

13. Method for managing a routing of communications of a wireless network comprising a set of at least two pairs comprising a sender device and a receiver device, wherein said method comprises steps of:

determining, for a receiver device, a critical area within the network for which the presence of at least one obstacle is liable to be disturbing for at least one communication involving said receiver device, said critical area being determined by analysis of characteristics of communication transmission of said at least two pairs of devices;

estimating a level of capacity of the receiver device to receive, by analysis of variations of quality of communications traversing said critical area; and adapting the routing of communications of the network to the estimated level of capacity to receive.

14. Method according to claim 13, wherein, with each of the devices having a determined communications coverage area, the two coverage areas of each pair having a mutual intersection area, the critical area is determined by a union of overlapping areas, each overlapping area being determined by mutual overlapping of at least two of said intersection areas.

15. Method according to claim 14, wherein said step of determining at least one critical area comprises at least one of the steps of:

excluding from said union of overlapping areas at least one overlapping area in which the presence of a disturbing obstacle is detected for a predetermined duration while said receiver device detects a level of quality of reception that remains higher than a predetermined threshold during said predetermined duration; and including at least one overlapping area in said union of overlapping areas, wherein the presence of a disturbing obstacle is detected during a predetermined duration while said receiver device detects a remaining level of reception quality that remains below a predetermined threshold during said predetermined duration.

16. Method according to claim 15, wherein said step of determining a critical area in which the presence of a disturbing obstacle is detected comprises a step of detecting whether the disturbing obstacle is fixed or mobile by analysis of variations in disturbances of the overlapping areas, detected as being disturbed according to a criterion of quality of link during a predetermined period.

17. Method according to claim 13, wherein the level of capacity of said receiver device to receive is estimated as a function of at least one of the two levels belonging to the group comprising:

a level of instability of the critical area representing a development of disturbances detected in the critical area; and a level of criticality of the critical area representing an estimated impact of disturbances detected in the critical area.

18. Method according to claim 13, further comprising a step of checking that, during a pre-determined period, the level of capacity of said receiver device to receive is above a predetermined threshold, and wherein the step of adapting the routing of the communications is performed only in the event of a negative check.

19. Computer-readable storage means storing a set of instructions that may be run by a computer in order to implement a method for managing a routing of communications of a wireless network comprising a set of at least two pairs comprising a sender device and a receiver device, wherein the following steps are performed when said set of instructions is executed:

determining, for a receiver device, a critical area within the network for which the presence of at least one obstacle is liable to be disturbing for at least one communication involving said receiver device, said critical area being determined by analysis of characteristics of communication transmission of said at least two pairs of devices;

estimating a level of capacity of the receiver device to receive, by analysis of variations of quality of communications traversing said critical area; and adapting the routing of communications of the network to the estimated level of capacity to receive.

20. Device for managing a routing of communications of a wireless network comprising a set of at least two pairs comprising a sender device and a receiver device, wherein said managing device comprising:

first means for determining, for a receiver device, a critical area for which the presence of at least one obstacle is liable to be disturbing for at least one communication involving said receiver device;

means for estimating a level of capacity of the receiver device to receive, by analysis of variations of quality of communications traversing said critical area; and means for adapting the routing of communications of the network to the estimated level of capacity to receive.

* * * * *